United States Patent
Wirola et al.

(10) Patent No.: US 10,976,404 B2
(45) Date of Patent: Apr. 13, 2021

(54) FINGERPRINT PROVISION CONTROL BASED ON DEVICE PROPERTIES

(71) Applicant: HERE GLOBAL B.V., Eindhoven (NL)

(72) Inventors: Lauri Aarne Johannes Wirola, Tampere (FI); Tommi Antero Laine, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 151 days.

(21) Appl. No.: 15/321,266

(22) PCT Filed: Jun. 23, 2014

(86) PCT No.: PCT/IB2014/062531
§ 371 (c)(1),
(2) Date: Dec. 22, 2016

(87) PCT Pub. No.: WO2015/198091
PCT Pub. Date: Dec. 30, 2015

(65) Prior Publication Data
US 2017/0160374 A1   Jun. 8, 2017

(51) Int. Cl.
*G01S 5/02* (2010.01)
(52) U.S. Cl.
CPC ................... *G01S 5/0252* (2013.01)
(58) Field of Classification Search
CPC .................................................. G01S 5/0252
USPC ...................................................... 455/456.1
See application file for complete search history.

(56) References Cited

U.S. PATENT DOCUMENTS

| 7,263,351 B2 | 8/2007 | Ross et al. |
| 7,551,922 B2 | 6/2009 | Roskowski et al. |
| 2012/0184219 A1 | 7/2012 | Richardson et al. |
| 2012/0240206 A1 | 9/2012 | Hoffman |

(Continued)

FOREIGN PATENT DOCUMENTS

| KR | 10-2009-0040102 A | 4/2009 |
| WO | WO 2013/136128 A1 | 9/2013 |

(Continued)

OTHER PUBLICATIONS

International Search Report and Written Opinion of the International Searching Authority for International Patent Application No. PCT/IB2014/062531 dated Mar. 20, 2015, 11 pages.

(Continued)

*Primary Examiner* — Joel Ajayi
(74) *Attorney, Agent, or Firm* — Alston & Bird LLP

(57) ABSTRACT

It is disclosed to transmit query information that comprises information on at least one property of a device (101), to obtain response information that comprises information indicating that the device has been determined, based at least on the information on the at least one property of the device comprised in the transmitted query information, to be one of suited to provide fingerprint information and unsuited to provide fingerprint information, wherein fingerprint information comprises information on at least one radio node and/or on at least one cell observed at at least one position of the device (102). It is further disclosed to obtain the query information, to determine if the device is one of suited to provide fingerprint information and unsuited to provide fingerprint information, and to transmit the response information.

20 Claims, 6 Drawing Sheets

(56) References Cited

U.S. PATENT DOCUMENTS

2015/0100743 A1  4/2015 Wirola et al.
2019/0200318 A1  6/2019 Wirola et al.

FOREIGN PATENT DOCUMENTS

WO  WO-2014/036062 A2  3/2014
WO  WO-2014/092997 A1  6/2014
WO  WO-2014/109996 A1  7/2014

OTHER PUBLICATIONS

Office Action for European Application No. 14744176.0 dated Sep. 3, 2018.
Summons to Attent Oral Proceedings for European Application No. 14 744 1 76.0 dated Mar. 27, 2020, 5 pages.
Office Action for European Application No. 14744176.0 dated Oct. 23, 2020.

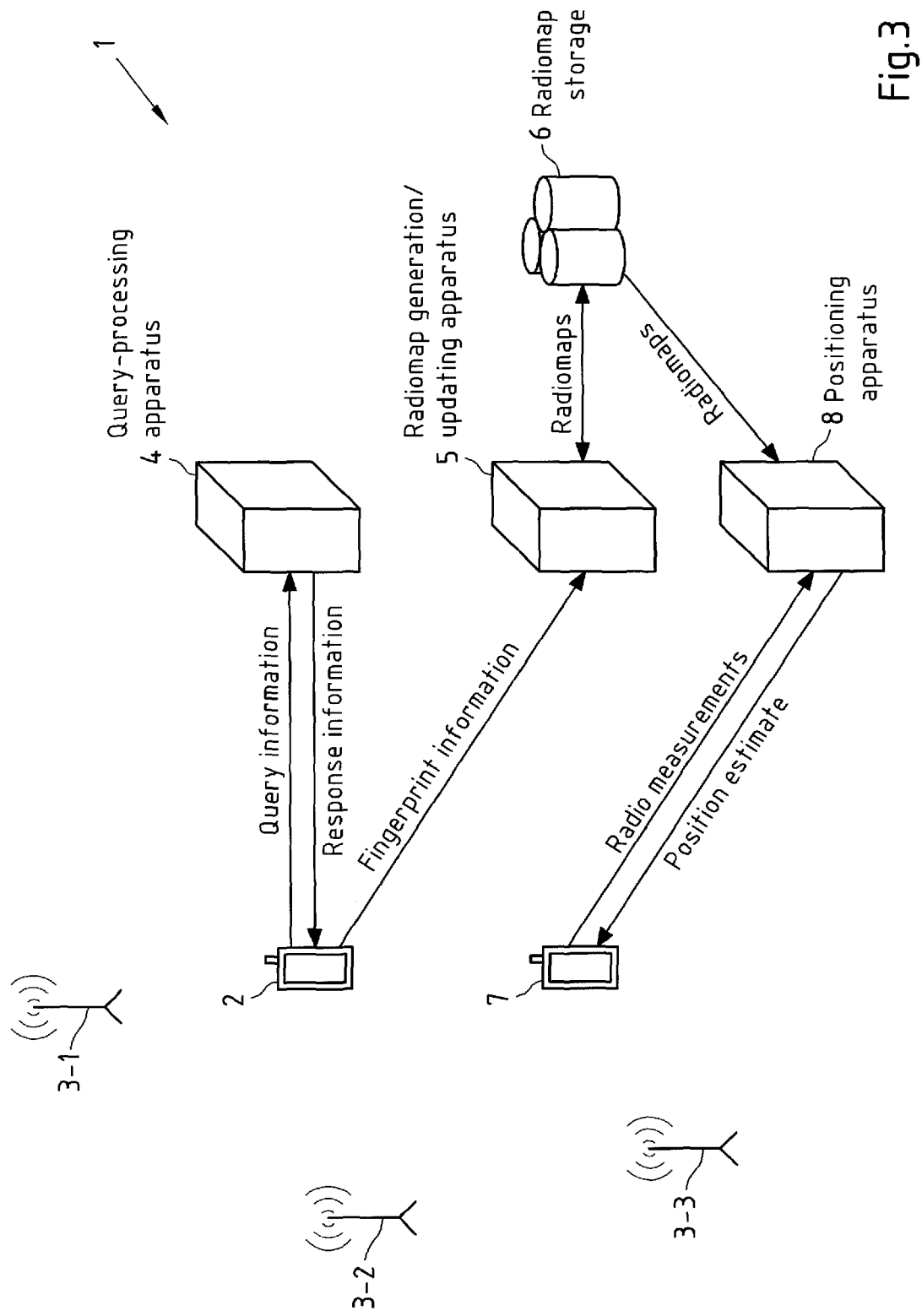

FINGERPRINT PROVISION CONTROL BASED ON DEVICE PROPERTIES

FIELD OF THE DISCLOSURE

The invention relates to the field of radiomap-based positioning of mobile devices, and more specifically to controlling the provision of fingerprint information by devices in a process of generating and/or updating radiomaps.

BACKGROUND

Modern global radiomap-based positioning technologies are based on generating large global databases containing information on cellular and/or non-cellular signals receivable from radio nodes such as base stations or access points at a plurality of positions. The information may originate entirely or partially from users of these positioning technologies acting as data collectors (so-called "crowd-sourcing" of information collection).

The data provided by these data collectors is typically in the form of "fingerprints", which at least contain information on measurements taken from the data collector's cellular and/or non-cellular radio interfaces at a position of the data collector. A fingerprint may further contain the data collector's position that is measured or estimated based on, e.g., received satellite signals of a global navigation satellite system (GNSS). Alternatively, the position of the data collector may be determined and associated with the fingerprint by another entity, e.g. a server. In the case of measurements on cellular signals, the results of the measurements may contain a global and/or local identification of the cellular network cells observed, their signal strengths and/or pathlosses and/or timing measurements like timing advance (TA) or round-trip time (RTT). For measurements on wireless local area network (WLAN) signals, as an example of signals of a non-cellular network, the results of the measurements may contain a basic service set identification (BSSID), like the medium access control (MAC) address of observed access points, and/or the service set identifier (SSID) of the observed access points, and/or the signal strength of received signals (received signal strength indication RSSI or physical Rx level in dBm with a reference value of 1 mW, etc.), and/or pathloss measurements/estimates and/or timing measurements (like e.g. RTT).

This fingerprint information may then be transferred to a server or cloud, where the data (usually from a multitude of users) may be collected and where a radiomap for positioning purposes may be generated and/or updated based on the data. Such a radiomap can for instance comprise estimates for respective coverage areas of one or more radio nodes and/or radio channel models for these one or more radio nodes.

In the end, this radiomap may be used for estimating the position of mobile devices. This may function in two modes. The first mode is the device-assisted mode, in which the mobile device performs the measurements of the cellular and/or non-cellular air interface, provides the measurements to the remote server, which in turn, based on the radiomap, determines and provides the position back to the mobile device. The second mode is the device-based mode, in which the mobile device has a local copy of the radiomap (or only a subset of the global radiomap). This subset copy is downloaded by the mobile device from a remote server for the area of interest (e.g. a small area around the current location, for a whole country, or so). This subset copy can of course also be pre-installed to the mobile device in the factory, but may then need to be refreshed at some point.

SUMMARY OF SOME EXAMPLE EMBODIMENTS OF THE INVENTION

One issue in crowd-sourced information collection systems is the quality of the collected data. In order to get the best coverage and to be able to react quickly on the changes in the radio landscape, it is advantageous to harvest data from as many different devices as possible. However, this also introduces risks—as the fingerprint collection and/or provision software (e.g. in the form of an agent) is distributed to more and more devices, there will also be more and more devices with low-quality components (e.g. GNSS receivers or radio transceivers) and/or software/hardware errors (e.g. concerning erroneous handling of radio node identifiers and/or cell identifiers) that can cause the fingerprint information to be of low quality and thus to adversely affect the quality of the radiomaps generated and/or updated based on this fingerprint information.

An example embodiment of a method according to a first aspect of the invention is disclosed, which comprises one of transmitting query information and causing query information to be transmitted, wherein the query information comprises information on at least one property of a device; and obtaining response information, wherein the response information comprises information indicating that the device has been determined, based at least on the information on the at least one property of the device comprised in the transmitted query information, to be one of suited to provide fingerprint information and unsuited to provide fingerprint information, wherein fingerprint information comprises information on at least one radio node and/or on at least one cell observed at at least one position of the device.

Furthermore, an example embodiment of a method according to a second aspect of the invention is disclosed, which comprises obtaining query information, wherein the query information comprises information on at least one property of a device; determining, based at least on the information on the at least one property of the device comprised in the obtained query information, if the device is one of suited to provide fingerprint information and unsuited to provide fingerprint information, wherein fingerprint information comprises information on at least one radio node and/or on at least one cell observed at at least one position of the device; and one of transmitting response information and causing response information to be transmitted, wherein the response information comprises information indicating that the device has been determined to be one of suited to provide fingerprint information and unsuited to provide fingerprint information.

Moreover, for both the first aspect and the second aspect of the invention (referred to as the "respective aspect" below), the following is disclosed:

An example embodiment of a computer program according to the respective aspect of the invention, the computer program when executed by a processor causing an apparatus to perform the presented example embodiment of the method according to the respective aspect of the invention.

An example embodiment of a computer readable storage medium according to the respective aspect of the invention, in which the presented example embodiment of the computer program according to the respective aspect of the invention is stored. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An first example embodiment of an apparatus according to the respective aspect of the invention, which is configured to perform or comprises respective means for performing the method according to the presented example embodiment of the method according to the respective aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means.

A second example embodiment of an apparatus according to the respective aspect of the invention, comprising at least one processor and at least one memory including computer program code, the at least one memory and the computer program code configured to, with the at least one processor, cause an apparatus at least to perform the presented example embodiment of the method according to the respective aspect of the invention.

Any of the disclosed example embodiments of apparatuses may be a module or a component for a device, for example a chip. Alternatively, any of the mentioned apparatuses may be a device, for instance a server or a mobile device. Any of the disclosed example embodiments of apparatuses may comprise only the indicated components or may further comprise one or more additional components.

Moreover, a first example embodiment of a system according to the invention is disclosed, comprising the presented first example embodiment of an apparatus according to the first aspect of the invention and the presented first example embodiment of an apparatus according to the second aspect of the invention.

Furthermore, a second example embodiment of a system according to the invention is disclosed, comprising the presented second example embodiment of an apparatus according to the first aspect of the invention and the presented second example embodiment of an apparatus according to the second aspect of the invention.

In example embodiments of the invention, response information is obtained in response to transmitted query information, wherein the response information indicates if the device has been determined to be suited to provide fingerprint information or not. This query-response mechanism forms a basis for a control of the provision of fingerprint information: Fingerprint information may for instance only be provided or caused to be provided (e.g. by the device or a component thereof) if the information comprised in the response information indicates that the device has been determined to be suited to provide fingerprint information.

Thus a control of the provision of fingerprint information can be exerted by receiving, for instance at a query-processing apparatus (e.g. a server), the query information containing information on at least one property of the device, determining that the device is suited or unsuited to provide fingerprint information based at least on the information on the at least one property comprised in the transmitted query information and on a database that comprises information on one or more devices that are classified as suited or unsuited to provide fingerprint information and the respective at least one property these devices have to be entitled for their respective classification, and transmitting according response information to the device. The data base may for instance comprise whitelists for devices that are classified as suited to provide fingerprint information and/or blacklists for devices that are classified as unsuited to provide fingerprint information, wherein this classification may for instance be based on a quality of the fingerprint information provided (or expected to be provided) by the respective devices.

This allows controlling whether fingerprint information is provided by a device or not, having the technical effect that devices that are considered to provide low-quality fingerprint information can be controlled not to provide fingerprint information. This in turn may result in vastly improved radiomaps that are generated and/or updated based on the provided fingerprint information.

Example embodiments of the invention thus provide a mechanism how to control the data inflow for a radiomap generation/updating process in a scenario where the fingerprint collection and/or provision software is distributed itself or as part of other software (e.g. a navigation software) to arbitrary devices (for instance via download from an application store to arbitrary devices).

In example embodiments of both aspects of the invention, there exists fingerprint information of at least two different types, and the information comprised in the response information indicates for which one or more types of the at least two different types of fingerprint information the device has been determined to be one of suited and unsuited to provide fingerprint information.

In example embodiments of both aspects of the invention, the information on at least one property of the device comprises at least one of information on a manufacturer of the device, information on a model of the device, information on a version of at least one hardware component of the device and information on a software of the device. The information on the software of the device may for instance comprise at least one of information on a firmware of the device, information on an operating system of the device and information on a computer program for collecting fingerprint information of the device.

In example embodiments of both aspects of the invention, respective information on properties of a device that is classified as suited or unsuited to provide fingerprint information is comprised in a database in a list (e.g. tuples) for the device or as a hash code for the device, or is comprised in different nesting stages of a nested structure or in different hierarchical levels of a tree structure.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 3 is a schematic illustration of a system in which example embodiments of apparatuses according to the first and second aspect of the invention are deployed;

DETAILED DESCRIPTION OF EXAMPLE EMBODIMENTS OF THE INVENTION

Figure 1:
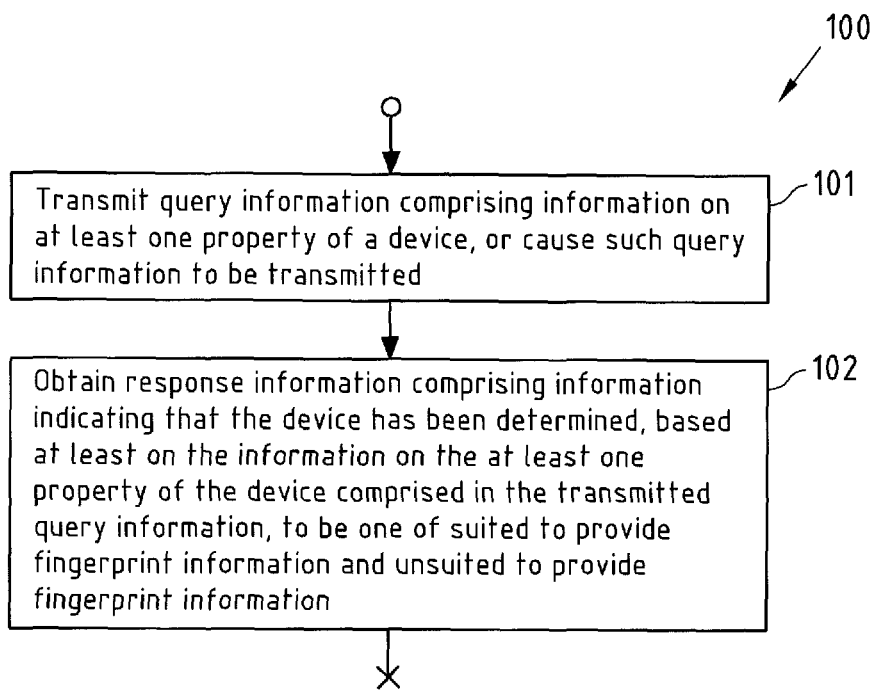
FIG. 1 is a flow chart illustrating an example embodiment of a method according to a first aspect of the invention.

FIG. 1 is a flowchart 100 of an example embodiment of a method according to a first aspect of the invention. In a step 101, query information is transmitted or caused to be transmitted. The query information comprises information on at least one property of a device. In a step 102, response information is obtained, wherein the response information comprises information indicating that the device has been determined, based at least on the information on the at least one property of the device comprised in the transmitted query information, to be one of suited to provide fingerprint information and unsuited to provide fingerprint information. Therein, fingerprint information comprises information on at least one radio node and/or on at least one cell observed at at least one position of the device.

The information comprised in the response information (if the device is suited or unsuited to provide fingerprint information) for instance is to affect one of providing fingerprint information and causing fingerprint information to be provided. Obtaining, in the response information, information that the device has been determined to be suited to provide fingerprint information may for instance be a necessary condition for one of providing fingerprint information and causing fingerprint information to be provided. The information comprised in the response information may for instance be to be considered by a process of one of providing fingerprint information and causing fingerprint information (which process may for instance be or be part of a process for collecting and/or providing fingerprint information).

In the flowchart 100, there thus may for instance be a further step of checking, if the information comprised in the response information indicates that the device has been determined to be suited to provide fingerprint information. If this was the case, fingerprint information would then be provided or caused to be provided in a further step. Otherwise, the flowchart would end.

The method of flowchart 100 is performed by an apparatus. Such an apparatus represents an example embodiment of an apparatus according to the first aspect of the invention. The apparatus may be associated with the device. The apparatus may for instance be a part of the device, or the apparatus and the device may be parts of the same unit. In example embodiments of the invention, the device is a mobile device, for instance a mobile device that is capable of determining which one or more radio nodes (e.g. of one or more cellular and/or non-cellular communication systems) and/or which one or more cells (e.g. of one or more cellular communication systems) are observable at its position, and is for instance further capable of determining its position (e.g. by means of a Global Navigation Satellite System (GNSS) receiver). Non-limiting examples of a mobile device are a mobile terminal, in particular a mobile phone, a personal digital assistant, a navigation device, a gaming device, a music and/or video player, a laptop computer or a tablet computer.

Figure 2:
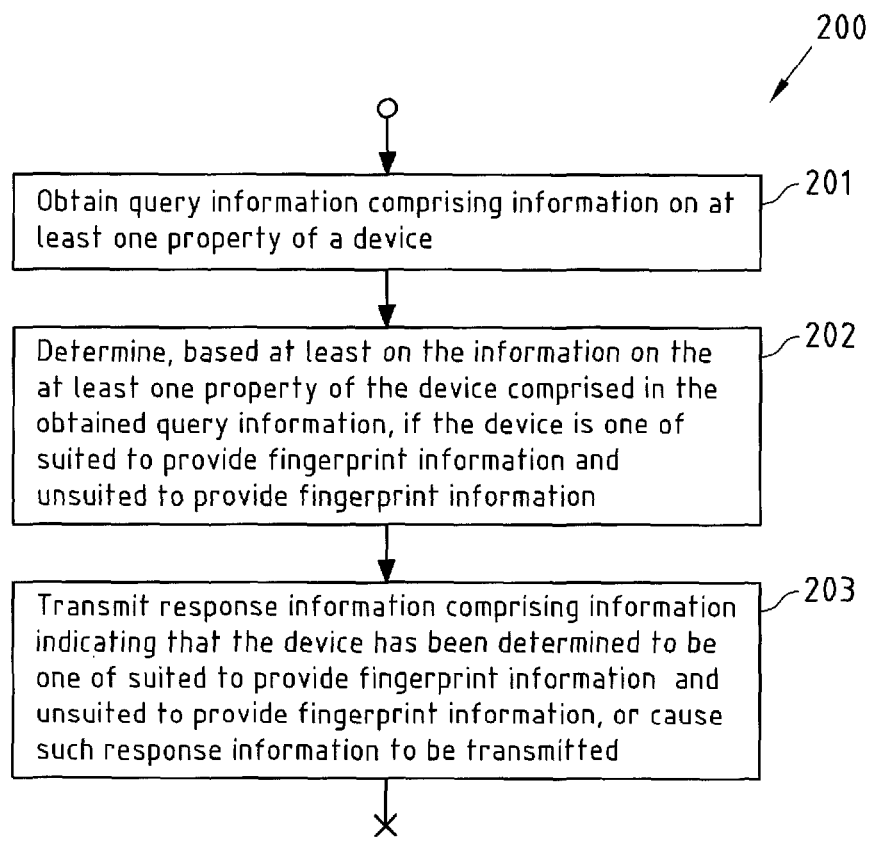
FIG. 2 is a flow chart illustrating an example embodiment of a method according to a first aspect of the invention.

FIG. 2 is a flowchart 200 of an example embodiment of a method according to a second aspect of the invention, which may be understood to complement the flowchart 100 of FIG. 1. In a first step 201, query information is obtained. The query information comprises information on at least one property of a device. The query information may in particular be the query information transmitted in step 101 of the flowchart 100 of FIG. 1. In a step 202, it is determined, based at least on the information on the at least one property of the device comprised in the obtained query information, if the device is one of suited to provide fingerprint information and unsuited to provide fingerprint information. Therein, fingerprint information comprises information on at least one radio node and/or on at least one cell observed at at least one position of the device. In a step 203, response information is transmitted or caused to be transmitted. The response information comprises information indicating that the device has been determined to be one of suited to provide fingerprint information and unsuited to provide fingerprint information. The response information may in particular be the response information received in step 102 of the flowchart 100 of FIG. 1

The flowchart 200 of FIG. 2 is performed by an apparatus. This apparatus represents an example embodiment of an apparatus according to the second aspect of the invention. The apparatus may for instance be a query-processing apparatus. In example embodiments of the invention, the apparatus is a query-processing server. The apparatus may be dedicated for the process of flowchart 200 only, or may comprise further functionality, such as for instance functionality to generate and/or update radiomaps based on received fingerprint information, and/or functionality to determine a position of a device based on measurement information received from the device and on radiomap information.

FIG. 3 schematically illustrates a system 1 in which the example embodiments of methods according to the first and second aspect of the invention may be deployed. Therein, device 2 and query-processing apparatus 4 may be considered as an example embodiment of a system according to the invention, with device 2 representing an example embodiment of an apparatus according to the first aspect of the invention and query-processing apparatus 4 representing an example embodiment of an apparatus according to the second aspect of the invention.

System 1 comprises a device 2, which may for instance be a mobile device such as for instance a mobile phone. Device 2 is at least capable of identifying one or more radio nodes (e.g. of one or more cellular and/or non-cellular communication systems) and/or one or more cells (e.g. of one or more cellular communication systems) at its position, and is for instance further capable of determining its position (e.g. by means of a Global Navigation Satellite System (GNSS) receiver). In FIG. 3, an exemplary number of three radio nodes 3-1, 3-2 and 3-3 are shown, which may for instance either be WLAN access points, or base stations of a cellular communication system, or a mixed ensemble thereof). In system 1, device 2 serves as a data collector device that collects fingerprint information and provides the fingerprint information to radiomap generation/updating apparatus 5, which generates radiomaps from the fingerprint information and causes the radiomaps to be stored in radiomap storage 6. Radiomaps from radiomap storage 6 may then for instance be used by positioning apparatus 8 to determine a position of device 7 and to provide information on this position to device 7. Device 7 is for instance not capable of determining its own position (e.g. due to lack of a GNSS receiver), but is capable of performing radio measurements that may for instance include at least information on the one or more radio nodes and/or cells that can be observed by device 7 at the position of device 7. Based on these radio measurements and on the radiomaps, positioning apparatus 8 is able to determine a position of device 7 and to provide information on this position to device 7 for use e.g. in a navigation application or other application requiring a current position of device 7. As an alternative to this device-assisted positioning mode, also a device-based positioning mode could be used, where the device has a local copy of at least a part of the radiomap and then is capable of determining its position itself. For simplicity of presentation, this latter mode is not illustrated in FIG. 3.

The information exchange between device 2 and query-processing apparatus 4 may for instance be based on at least partially wireless transmission. For instance, device 2 may use a cellular communication system to connect to a network, e.g. the Internet, to which in turn the query-processing apparatus 4 may be connected via a wirebound connection. The information exchange between device 2 and query-processing apparatus 4 may for instance be based on the Internet Protocol (IP) and/or the Transmission Control Protocol (TCP). The information exchange between device 7 and radiomap generation/updating server 5 may for instance take place as described for the information exchange between device 2 and the query-processing apparatus 4. Query information and response information may then for instance be contained in the payload of TCP segments (e.g. formatted in XML), or in the payload of higher-protocol-layer protocol data units (that in turn are comprise in the payload of TCP segments)).

It is to be noted that each of the query-processing apparatus 4, the radiomap generation/updating apparatus 5 and the positioning apparatus 8 may be embodied as a computer, in particular as a server. Query-processing apparatus 4 and radiomap generation/updating apparatus 5 may for instance be functional parts of the same unit, such as for instance a server. Also the functionality of positioning apparatus 8 may be included into such a joint unit.

In the system 1 of FIG. 3, non-limiting examples of radio nodes 3-1, 3-2 and 3-3 are base stations (or sectors thereof) of a cellular communication system, such as for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication system, or access points or beacons of a non-cellular radio communication system, such as for instance a WLAN system, a Bluetooth system, a radio-frequency identification (RFID) system, a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc. A cellular communication system may for instance be characterized by a basically seamless pavement of a geographical area (usually in the order of at least hundreds or thousands of square kilometers) with cells in which coverage is provided by respective radio nodes that are operated by the same operator, which system may for instance support communication handover between cells. Consequently, a non-cellular communication system may be characterized as a communication system that does not have all of these properties. Radio nodes 3-1, 3-2 and 3-3 may be of the same communication system, but may equally well stem from different communication systems (e.g. different cellular communication systems, different non-cellular communication systems or from a mixture of cellular and non-cellular communication systems).

Each of radio nodes 3-1, 3-2 and 3-3 provides radio coverage in a respective coverage area. Coverage areas may be modelled by coverage area models. A radiomap may then for instance comprise information representative of the respective coverage area models for a plurality of radio nodes, e.g. for a specific area. Additionally or alternatively, a radiomap may comprise information such as radio node positions, radio channel models, Rx fields, etc. A radio channel model may for instance describe how the power of a signal emitted by a radio node decays with increasing distance from the radio node, for instance under consideration of further parameters as for instance the radio transmission frequency. To this end, the radio channel model may for instance take into account effects of free space propagation, slow fading and fast fading, to name but a few examples. A coverage area generally depends on a plurality of parameters of both the radio node that provides the coverage area (inter alia antenna beamwidth and positioning, transmission power) and the propagation environment (inter alia pathloss and shadowing caused by obstructing elements). A coverage area model may for instance be or at least be desired to be representative of a coverage area. However, at least temporary deviations may occur between the model and the actual coverage area, for instance in case of changes or movement of the coverage area. A model for a coverage area may for instance be a model representing hard boundaries of a coverage area, or a model that represents a coverage area in a statistical sense, for instance by means of a probability (density) function. An example of such a statistical representation of a coverage model is a multi-normal distribution. A coverage area model may only be a coarse model of a coverage area, e.g. an elliptical or polygonal model. The coverage area model may equally well be constituted by a set of grids of a grid of regions, e.g. a rectangular grid of regions. In a simple exemplary case, a coverage area model may be represented by a position of the radio node providing the coverage area and information on the reach of this radio node. In a cellular system, a coverage area of a radio node may for instance at least roughly correspond to a cell associated with the radio node.

Now, if a device like device 7 determines that it can presently observe radio nodes 3-1, 3-2 and 3-3, or can presently observe cells that are respectively associated with these radio nodes 3-1, 3-2 and 3-3 in case of cellular communication systems, this means that device 7 is located in the intersection of the respective coverage areas of these radio nodes or cells. A position of device 7 may then be determined by positioning apparatus 8 based on the coverage area models for these three radio nodes or cells, which coverage area models are contained in the radiomap available to positioning apparatus 8 due to his interface to radiomap data storage 6 and can be identified based on the radio node or cell identification information contained in the radio measurements provided by device 7 to positioning apparatus 8. Instead of (or in addition to) the coverage area models, also the mere position of the three observed radio nodes 3-1, 3-2 and 3-3 may be used by positioning apparatus 8 to determine a position for device 7, perhaps by additionally taking into account Received Signal Strength (RSS) and/or pathloss measurements performed by device 7 and included in the radio measurements provided to positioning apparatus 8, which RSS/pathloss measurements give an indication of a distance of device 7 towards the respective radio nodes 3-1, 3-2 and 3-3.

A radio node (or a cell associated with the radio node) may for instance be observable by a device if the device is able to receive one or more signals (e.g. a broadcast channel) sent by the radio node with a pre-defined minimum quality (for instance defined in terms of a signal-to-noise ratio or a signal-to-noise and interference ratio), and/or is able to at least partially receive and correctly decode one or more signals sent by the radio node, and/or is able to receive and correctly decode an identifier of the radio node (or an identifier of the cell that is associated with the radio node). Some or all of these conditions for observing a radio node (or a cell associated with the radio node) may for instance be met when the device is within the coverage area of the radio node. Therein, a radio node or cell may for instance have an identifier that is unique (e.g. globally unique) at least in the communication system (and for instance also in all other communication systems). Equally well, a radio node or cell may for instance have an identifier that is not unique (e.g. only locally unique) in the communication system, but that is at least unique in a subregion of the region covered by the communication system. Such locally unique identifiers are for instance based on a set of one or more physical resources assigned for use by a radio node or cell by a network operator. Non-limiting examples of such resources are frequency channels, timeslots, spreading codes, scrambling codes, spatial channels (e.g. antenna beams, space-time codes or eigenmodes) and polarization channels. Non-limiting examples of (e.g. globally unique) identifiers of radio nodes or cells are cellular cell identifiers (e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system), and identifiers of WLAN access points (e.g. a BSSID like a Medium Access Control (MAC) identifier of a WLAN access point).

A prerequisite for the generation of the radiomaps in radiomap storage 6 is the collection and provision of fingerprint information by data collector devices, such as for instance device 2, to radiomap generation/updating apparatus 5. Fingerprint information comprises information on at least one radio node and/or cell observed at at least one position of device 2. The fingerprint information may further comprise respective information on the at least one position of device 2. The information on the position may for instance be produced (e.g. measured or estimated) by a GNSS receiver of device 2 (e.g. a Global Positioning System (GPS) receiver, an Assisted GPS (A-GPS) receiver, a Galileo receiver, a GLObal NAvigation Satellite System (GLONASS) receiver, or a Beidou receiver, to name but a few examples), but may alternatively be taken from a map or determined by another positioning technique. If the fingerprint information contains information on several positions, the information on the positions may for instance have been determined (e.g. measured) at different time instants, so that, e.g. due to mobility of device 2, the positions are all different. For each position, it is determined which radio nodes and/or cells are observable at this position. This may for instance be accomplished by checking which radio nodes and/or cells are observable by the device at a time instant and also determining the information on the position substantially at this time instant. To ensure that the radio nodes and/or cells determined to be observable and the information on the position are sufficiently associated, i.e. pertain to the same position of device 2, it may be necessary to produce the information on the position and to determine which radio nodes and/or cells are observable within a time window of limited length, e.g. of a length of 10 s, 5 s, 1 s, 500 ms, 100 ms or 10 ms, to name but a few values. The higher the velocity of device 2, the smaller the length of the time window should be. The information on the one or more radio nodes and/or cells comprised in the fingerprint information may be in the form of identifiers, e.g. global and/or local cell IDs in case of cells or BSSIDs in case of (non-cellular) radio nodes, as already discussed above. The fingerprint information may equally well comprise RSS and/or pathloss and/or timing (e.g. Timing Advance or Round-Trip-Time) measurements performed by device 2, as already discussed above. Such information may equally well be introduced into radiomaps and then exploited for positioning devices like device 7.

Alternatively, the position of device 2 may be determined by a unit that is different from device 2, such as for instance positioning apparatus 8, e.g. based on radiomap-based positioning, and information on the position of device 2 may then be associated with (e.g. included into) fingerprint information provided by device 2. For instance, device 2 may collect information for a radiomap for radio nodes or cells of one or more cellular communication systems, and the lacking positions of device 2 may be determined (e.g. by positioning apparatus 8 or another apparatus that is different from device 2) based on an existing radiomap for radio nodes of one or more non-cellular communication systems (e.g. a WLAN system). Device 2 may then provide fingerprint information with information on radio nodes and/or cells of both the one or more cellular communication systems (to be used for the generation and/or updating of the radiomap) and the one or more non-cellular communication systems (to allow its position to be determined).

There may for instance exist fingerprint information of at least two different types. For instance, a type of the fingerprint information may pertain to a type of the at least one observed radio node and/or cell for which the fingerprint information contains information. The type of the observed radio node and/or cell may for instance be a non-cellular (e.g. WLAN) type or a cellular type. Accordingly, the type of the fingerprint information may then be a non-cellular type or a cellular type. The type of the observed radio node and/or cell may even be further detailed, e.g. be a 2G, 3G or 4G cellular type (to name but a few examples), pertaining to a cellular communication system to which the at least one radio node and/or cell belongs. Additionally or alternatively, a type of the fingerprint information may pertain to a status of the at least one observed radio node and/or cell for which the fingerprint information contains information. The status may for instance be a serving cell status or a neighbor cell status. Accordingly, the type of the fingerprint information may then for instance be a serving cellular type or a neighbor cellular-type. Again, this may be further detailed, for instance in the form of a 3G serving cellular type or a 2G neighbor cellular type. Device 2 may be capable of collecting and/or providing fingerprint information of one or more types, e.g. of at least two types. For instance, device 2 may be capable of providing non-cellular fingerprint information, and furthermore serving cellular fingerprint information and neighbor cellular fingerprint information. It may however depend on the information comprised in the response information which of these types of fingerprint information device 2 is allowed to collect and/or provide.

The quality of fingerprint information (e.g. in general, or only with respect to one or more different types of fingerprint information) may significantly depend on properties of the device 2 that produces the fingerprint information. For instance, the information on a position contained in the fingerprint information may vary with the quality of the GNSS receiver deployed in device 2, and also the capability to observe far-apart radio nodes or cells with far-apart radio nodes (e.g. radio nodes that are received with comparably low signal levels) may depend on the quality of the respective radio receivers (or transceivers) for cellular and/or non-cellular systems of device 2. Proper functioning of the fingerprint information collection (e.g. in general, or only with respect to one or more different types of fingerprint information) may additionally or alternatively depend on the firmware used by device 2, and/or on further properties such as for instance the fingerprint collection and/or provision software and/or the operating system deployed by the device. For instance, devices may have issues with correctly handling identifiers of radio nodes/cells, which issues may be mainly or entirely attributable to software flaws. As an example, devices may not continue to decode radio node/cell identifiers after a status change (for instance, if WLAN connectivity of a device is disabled), but may continue to report fingerprints with a previously decoded radio node/cell identifier and information on new positions instead. As a further example, previous radio node/cell identifiers may be maintained for a significant time even after a handover of the device from a first radio node/cell to a second radio node/cell has occurred (this may occur in both intrasystem handovers and inter-system handovers). Moreover, if different types of identifiers exist for a radio node/cell, such as for instance a globally unique radio node/cell identifier (such as for instance a PLMN (Public Land Mobile Network)+a 28-bit UCID (UMTS Terrestrial Radio Access Cell ID) for a WCDMA (Wide-Band Code Division Multiple Access) system) and a locally unique identifier (such as for instance a UARFCN-DL (UNITS Terrestrial Radio Access Absolute Radio Frequency Channel-Downlink) and a P-CPICH (Primary Control Pilot Channel) for a WCDMA system), and if these different types of identifiers are reported in the fingerprint information, there may be errors so that these reported radio node/cell identifiers do not respectively pertain to the same radio node/cell (e.g. one of these radio node/cell identifiers may be outdated). And, as a further example, if fingerprint information does not only pertain to observable serving cells of cellular communication systems, but also to observable neighboring cells of the same or another cellular communication system (which neighboring cells may for instance be identified based on locally unique identifiers (e.g. physical resources as described above, such as for instance the UARFCN-DL and a P-CPICH for a WCDMA system), there may be flaws in the correct identification and/or reporting of these neighboring cells.

In example embodiments of the present invention, it is therefore proposed not to allow all devices (of which in FIG. 3, only device 2 is exemplarily shown) to provide fingerprint information (e.g. in general, or only one or more different types of fingerprint information) to radiomap generation/updating apparatus 5, but to introduce a control mechanism that ensures that only classified devices provide fingerprint information (e.g. in general, or only fingerprint information of the one or more types for which the device is considered to be suited).

As illustrated in FIG. 3, device 2, to this end, transmits query information to query-processing apparatus 4, which serves as a control instance (see step 101 of FIG. 1 and step 201 of FIG. 2). The query information contains information on at least one property of device 2, e.g. information on the manufacturer, model and firmware of device 2. Based on this information (and for instance further information on properties of devices that are classified as suited or unsuited to provide fingerprint information stored in a database, as will be discussed below), query processing apparatus 4 determines if device 2 is suited to provide fingerprint information (e.g. in general, or only with respect to one or more different types of fingerprint information) to radiomap generation/updating apparatus 5 (step 202 of FIG. 2). The result of this determining is then transmitted in response information to device 2 (step 203 of FIG. 2 and step 102 of FIG. 1). Device 2 then for instance checks if it has been determined that device 2 is suited to provide fingerprint information (e.g. in general, or only with respect to one or more types of fingerprint information), and only if this is the case, device 2 may start to provide fingerprint information (e.g. in general, or only with respect to the one or more types of fingerprint information, respectively) to radiomap generation/updating apparatus 5 (step 104 of FIG. 1).

The response information may for instance simply comprise information indicative of a positive or negative determination, such as for instance a string "OK" if the device 2 is considered suited to provide fingerprint information and/or a string "NOK" if the device 2 is considered unsuited to provide fingerprint information, or a bit that is set accordingly (e.g. "0" for unsuited and "1" for suited). If there exists fingerprint information of at least two different types, the response information may for instance comprise respective information indicative of a positive or negative information for at least one (or all) of these different types. For instance, if there exist three different types of fingerprint information, e.g. WLAN type, serving cellular type and neighbor cellular type, there may be respective information (e.g. a string or flag) indicating whether the device has been determined to be suited or unsuited to provide WLAN type fingerprint information, whether the device has been determined to be suited or unsuited to provide serving cellular type fingerprint information or not, and whether the device has been determined to be suited or unsuited to provide neighbor cellular type fingerprint information. Alternatively, for instance only information on the one or more types of fingerprint information for which the device has been determined to be suited may be included in the response information, and the information for the one or more further types of fingerprint information may then be inferred to be negative (indicating that the device is unsuited to provide the respective type of fingerprint information).

Additionally or alternatively, the response information may contain information that is required by device 2 to be able to provide fingerprint information, for instance a key or code that makes this fingerprint provision (and possibly also the fingerprint collection) functionality accessible and/or operational in the fingerprint collection and/or provision software of device 2 and/or an information (e.g. a key or code or an address) that is required to establish a connection with radiomap generation/updating apparatus 5 for providing the fingerprint information.

Figure 4A:
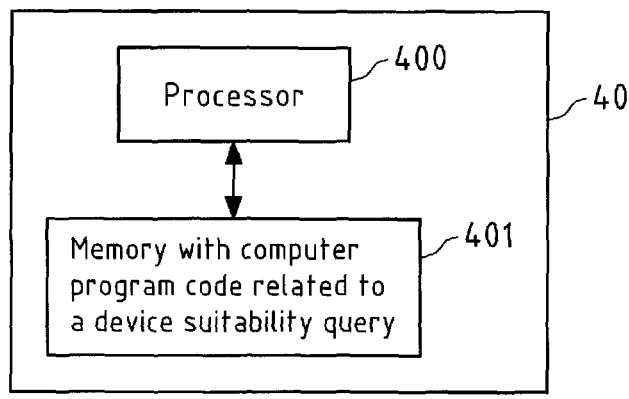
FIG. 4a is a schematic block diagram of an example embodiment of an apparatus according to the first aspect of the invention.

FIG. 4a is a schematic block diagram of an example embodiment of an apparatus 40 according to the first aspect of the invention. Apparatus 40 of FIG. 4a may for instance represent at least a part (e.g. a functional unit or module) of device 2 of FIG. 3.

Apparatus 40 comprises at least one processor 400 and at least one memory 401 including computer program code, the at least one memory 401 and the computer program code configured to, with the at least one processor 400, cause an apparatus (for instance apparatus 40, or another apparatus that comprises apparatus 40, e.g. apparatus 41 of FIG. 4b) at least to perform the method of FIG. 1 (and for instance also one or more of its further features that will be discussed below). Processor 400 for instance executes the computer program code stored in memory 401. Processor 400 for instance accesses memory 401 via a bus.

The memory 401 comprises a computer program code related to a device suitability query (and for instance further related to a suitability-dependent provision of fingerprint information). The computer program code thus represents an example embodiment of a computer program according to the first aspect of the invention, i.e. a computer program that when executed by processor 400 causes apparatus 40 (or an apparatus that comprises apparatus 40, e.g. apparatus 41 of FIG. 4b) to perform the actions of the method of FIG. 1.

Apparatus 40 is also an example embodiment of an apparatus that is configured to perform or comprises respective means for performing the method of FIG. 1 (and for instance also one or more of its further features that will be discussed below). The processor 400 of apparatus 40 may for instance represent means for performing the method of FIG. 1. Apparatus 40 may thus for instance comprise means for causing query information to be transmitted, and means for obtaining response information (and for instance also means for causing fingerprint information to be provided, if the information comprised in the response information indicates that the device (e.g. a device apparatus 40 is comprised in) has been determined to be suited to provide fingerprint information). These means may be represented by different functional modules or different circuitry of processor 400, or may at least partially or entirely be represented by the same functional modules or the same circuitry.

Figure 4B:
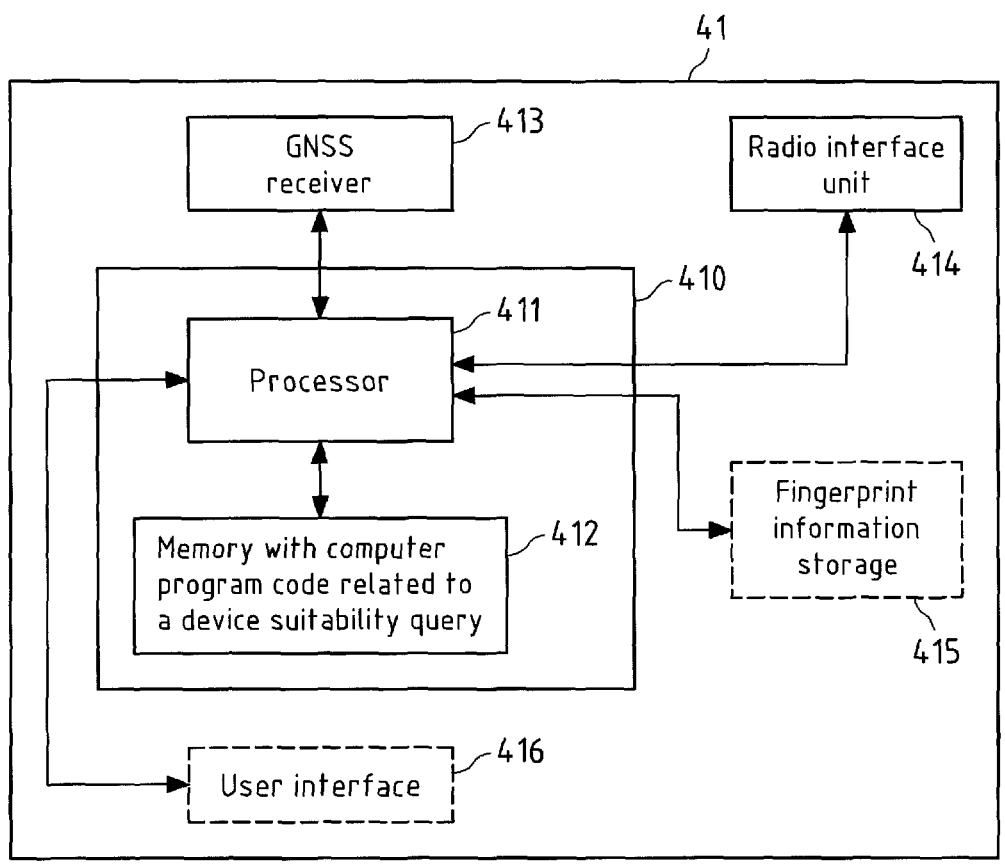
FIG. 4b is a schematic block diagram of an apparatus that comprises example embodiments of apparatuses according to the first aspect of the invention.

FIG. 4b is a schematic block diagram of an apparatus 41 that is either an example embodiment of an apparatus 41 according to the first aspect of the invention or an apparatus 41 that comprises an example embodiment of an apparatus 410 according to the first aspect of the invention. Apparatus 41 may for instance represent device 2 of FIG. 3, or a part thereof.

Apparatus 41 comprises a unit 410 (for instance embodied as an integrated circuit), that comprises a processor 411 and a memory 412 with computer program code related to a device suitability query (and for instance further to a suitability-dependent provision of fingerprint information). Apparatus 41 further comprises a GNSS receiver 413 that is configured to provide information (e.g. a measurement or estimate) on the current position of GNSS receiver 413 and thus also of apparatus 41. GNSS receiver 413 is for instance configured to provide the information on the position to processor 411, so that processor 411 is able to include the information on the position into fingerprint information. GNSS receiver 413 may equally well be replaced by another unit for determining a position of apparatus 41, or may be dispensed with at all, if the fingerprint information does not require information on the position(s) of apparatus 41 or a device that comprises apparatus 41. Apparatus 41 further comprises a radio interface unit 414 providing respective interfaces to one or more cellular and/or non-cellular communication systems. Radio interface unit 414 enables apparatus 41 at least to observe radio nodes and/or cells associated with radio nodes of those communication systems to which radio interface unit 414 is compatible (of course only when apparatus 41 is in the coverage area of these radio nodes). Radio interface unit 414 may further enable apparatus 41 to communicate with radio nodes of those communication systems to which radio interface unit 414 is compatible. Examples of communication systems have already been presented above. In particular, radio interface unit 414 may enable apparatus 41 to transmit query information (in particular to query-processing apparatus 4 of FIG. 4) and to receive response information (in particular from query-processing apparatus 4), and to provide fingerprint information (in particular to radiomap generation/updating apparatus 5). Radio interface unit 414 may for instance be representative of the RF frontend components, the Analog Baseband (ABB) components, the Digital Baseband (DBB) components and the baseband processor. Apparatus 41 may further comprise an optional fingerprint information storage 415, which may be embodied as a removable memory card such as for instance an SD card and may thus be used to provide fingerprint information based on a tangible data carrier rather than based on a wireless transmission signal. The SD card may for instance be removed from apparatus 41, inserted into a computer for readout of the fingerprint information and transfer to the radiomap generation/updating server 5, to name but an example. Furthermore, apparatus 41 may comprise an optional user interface 416 that is controlled by processor 411 and may for instance comprise a display, a keyboard, a keypad or a touchscreen, to name but a few examples. The display or the touchscreen may for instance be used to display response information to a user of apparatus 41 to inform him/her that the device has been determined suited or unsuited to provide fingerprint information.

Unit 410 of apparatus 41 may for instance be the apparatus 40 of FIG. 4a and thus may constitute, within apparatus 41, an example embodiment of an apparatus according to the first aspect of the invention.

Unit 410 comprises at least one processor 411 and at least one memory 412 including computer program code, the at least one memory 412 and the computer program code configured to, with the at least one processor 411, cause unit 410 at least to perform the method of FIG. 1 (and for instance also one or more of its further features that will be discussed below). Unit 410 is then in particular caused to perform the actions of causing query information to be transmitted (e.g. by controlling radio interface unit 414), and obtaining response information (at processor 411, e.g. from radio interfaces unit 414) (and for instance also causing fingerprint information to be provided (e.g. by controlling radio interface unit 414 or fingerprint information storage 415), if the information comprised in the response information indicates that the device (e.g. a device unit 410 is comprised in) has been determined to be suited to provide fingerprint information).

Alternatively, Unit 410 comprises at least one processor 411 and at least one memory 412 including computer program code, the at least one memory 412 and the computer program code configured to, with the at least one processor 411, cause apparatus 41 *t* least to perform the method of FIG. 1 (and for instance also one or more of its further features that will be discussed below). Apparatus 41 is then in particular caused to perform the actions of transmitting query information (e.g. via radio interface unit 414), and obtaining response information (e.g. via radio interfaces unit 414) (and for instance also providing fingerprint information to be provided (e.g. via radio interface unit 414 or fingerprint information storage 415), if the information comprised in the response information indicates that the device (e.g. apparatus 41) has been determined to be suited to provide fingerprint information).

The memory 412 comprises a computer program code related to a device suitability query (and for instance also a suitability-dependent provision of fingerprint information). The computer program code thus represents an example embodiment of a computer program according to the first aspect of the invention, e.g. a computer program that when executed by processor 411 causes unit 410 to perform the actions of the method of FIG. 1, in particular the actions of causing query information to be transmitted, and obtaining response information (and for instance also causing fingerprint information to be provided, if the information comprised in the response information indicates that the device has been determined to be suited to provide fingerprint information), or a computer program that when executed by processor 411 causes apparatus 41 to perform the actions of the method of FIG. 1, in particular the actions of transmitting query information, and obtaining response information (and for instance also providing fingerprint information, if the information comprised in the response information indicates that the device has been determined to be suited to provide fingerprint information).

Unit 410 then is also an example embodiment of an apparatus that is configured to perform or comprises respective means for performing the method of FIG. 1 (and for instance also one or more of its further features that will be discussed below). The processor 411 of unit 410 may for instance represent means for performing the method of FIG. 1. Unit 410 may thus for instance comprise means for causing query information to be transmitted, and means for obtaining response information (and for instance also means for causing fingerprint information to be provided, if the information comprised in the response information indicates that the device has been determined to be suited to provide fingerprint information). These means may be represented by different functional modules or different circuitry of processor 411, or may at least partially or entirely be represented by the same functional modules or the same circuitry.

As already stated, also apparatus 41 of FIG. 4*b* constitutes an example embodiment of an apparatus according to the first aspect of the invention.

Apparatus 41 comprises at least one processor 411 and at least one memory 412 including computer program code, the at least one memory 412 and the computer program code configured to, with the at least one processor 411, cause apparatus 41 at least to perform the method of FIG. 1 (and for instance also one or more of its further features that will be discussed below). Apparatus 41 is then in particular caused to perform the actions of transmitting query information (e.g. via radio interface unit 414), and obtaining response information (e.g. via radio interfaces unit 414) (and for instance also providing fingerprint information to be provided (e.g. via radio interface unit 414 or fingerprint information storage 415), if the information comprised in the response information indicates that the device (e.g. apparatus 41) has been determined to be suited to provide fingerprint information).

Apparatus 41 then is also an example embodiment of an apparatus that is configured to perform or comprises respective means for performing the method of FIG. 1 (and for instance also one or more of its further features that will be discussed below). The processor 411 of apparatus 41 may for instance represent means for performing the method of FIG. 1. Apparatus 41 may thus for instance comprise means (radio interface(s) 414) for transmitting query information, and means for obtaining response information (processor 411) (and for instance also means for providing fingerprint information (radio interface(s) 414), if the information comprised in the response information indicates that the device has been determined to be suited to provide fingerprint information).

Memory 412 may of course comprise further computer program code, for instance a fingerprint collection and/or provision software that, when run on processor 411, causes apparatus 41 to collect fingerprint information (e.g. in regular intervals, e.g. each minute) and to provide this fingerprint information (or several stacked sets of fingerprint information) to an external entity (e.g. to radiomap generation/updating apparatus 5 of FIG. 3; e.g. in regular intervals or whenever a pre-defined number of sets of fingerprint information has been collected). The computer program code causing processor 411 to cause apparatus 41 to perform the method of FIG. 1 may for instance be an extension to this fingerprint collection and/or provision software that controls the fingerprint collection and/or provision software from outside (e.g. as a standalone program), or may be integrated into the fingerprint collection and/or provision software.

Figure 5A:
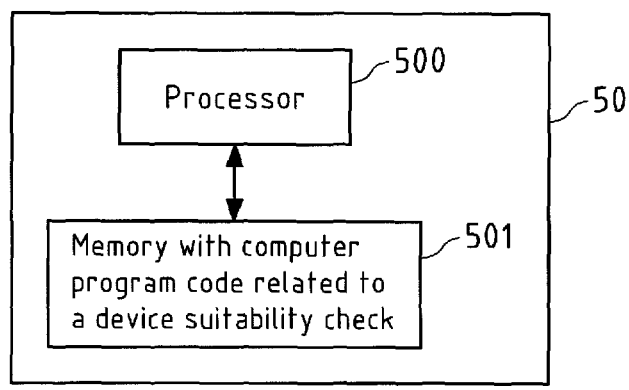
FIG. 5a is a schematic block diagram of an example embodiment of an apparatus according to the second aspect of the invention.

FIG. 5*a* is a schematic block diagram of an example embodiment of an apparatus 50 according to the second aspect of the invention. Apparatus 50 of FIG. 5*a* may for instance represent at least a part (e.g. a functional unit or module) of query-processing apparatus 4 of FIG. 3.

Apparatus 50 comprises at least one processor 500 and at least one memory 501 including computer program code, the at least one memory 501 and the computer program code configured to, with the at least one processor 500, cause an apparatus (for instance apparatus 50, or another apparatus that comprises apparatus 50, e.g. apparatus 51 of FIG. 5*b*) at least to perform the method of FIG. 2 (and for instance also one or more of its further features that will be discussed below). Processor 500 for instance executes the computer program code stored in memory 501. Processor 500 for instance accesses memory 501 via a bus.

The memory 501 comprises a computer program code related to a device suitability check. The computer program code thus represents an example embodiment of a computer program according to the second aspect of the invention, i.e. a computer program that when executed by processor 500 causes apparatus 50 (or an apparatus that comprises apparatus 50, e.g. apparatus 51 of FIG. 5b) to perform the actions of the method of FIG. 2.

Apparatus 50 is also an example embodiment of an apparatus that is configured to perform or comprises respective means for performing the method of FIG. 2 (and for instance also one or more of its further features that will be discussed below). The processor 500 of apparatus 50 may for instance represent means for performing the method of FIG. 2. Apparatus 50 may thus for instance comprise means for obtaining query information, means for determining, if the device (e.g. device 2 of FIG. 3) is one of suited to provide fingerprint information and unsuited to provide fingerprint information, and means for causing response information to be transmitted. These means may be represented by different functional modules or different circuitry of processor 500, or may at least partially or entirely be represented by the same functional modules or the same circuitry.

Figure 5B:
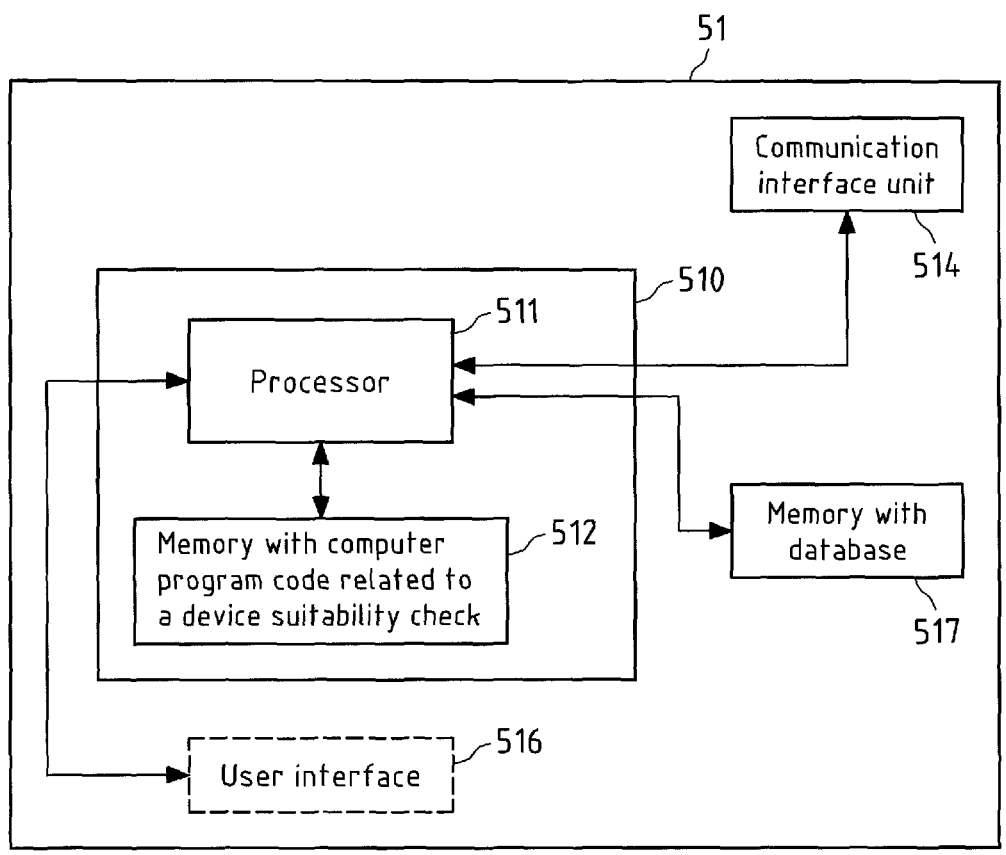
FIG. 5b is a schematic block diagram of an apparatus that comprises example embodiments of apparatuses according to the second aspect of the invention.

FIG. 5b is a schematic block diagram of an apparatus 51 that is either an example embodiment of an apparatus 51 according to the second aspect of the invention or an apparatus 51 that comprises an example embodiment of an apparatus 510 according to the second aspect of the invention. Apparatus 51 may for instance represent query-processing apparatus 4 of FIG. 3, or a part thereof.

Apparatus 51 comprises a unit 510 (for instance embodied as an integrated circuit), that comprises a processor 511 and a memory 512 with computer program code related to a device suitability check.

Apparatus 51 further comprises a communication interface unit 514 providing an interface to one or more communication networks. One or more of these communication networks may be wireless or wirebound. Communication interface unit 514 may for instance allow apparatus 51 to connect to a network, such as for instance the Internet, or to a cellular or non-cellular wireless communication network. If device 2 of FIG. 3 is then also capable of accessing the Internet or using the wireless communication network, device 2 and apparatus 51 can exchange information, such as query information and response information. Furthermore, apparatus 51 may comprise an optional user interface 516 that is controlled by processor 511 and may for instance comprise a display and/or a keyboard, to name but a few examples. The display may for instance be used to display a status of the determining if a device is suited or unsuited to provide fingerprint to an operator of apparatus 51. Apparatus 51 further comprises a memory 517 for storing a database. This database may for instance contain information on devices that are classified as suited or unsuited to provide fingerprint information (e.g. in general, or for one or more types of fingerprint information, respectively) as well as information representative of information on the one or more properties these devices respectively have to be entitled to their classification as suited/unsuited to provide fingerprint information (e.g. in general, or for the one or more types of fingerprint information, respectively).

The information contained in memory 517 is accessible to processor 511 and may be used for determining in step 202 of FIG. 2 if the device is suited or unsuited to provide fingerprint information (e.g. in general, of for one or more types of fingerprint information). Memory 517 may for instance be a non-volatile memory. It may for instance be a hard disc drive, a Storage Area Network (SAN) or a Direct Attached Storage (DAS), to name but a few examples.

Unit 510 of apparatus 51 may for instance be the apparatus 50 of FIG. 5a and thus may constitute, within apparatus 51, an example embodiment of an apparatus according to the second aspect of the invention.

Unit 510 comprises at least one processor 511 and at least one memory 512 including computer program code, the at least one memory 512 and the computer program code configured to, with the at least one processor 511, cause unit 510 at least to perform the method of FIG. 2 (and for instance also one or more of its further features that will be discussed below). Unit 510 is then in particular caused to perform the actions of obtaining query information, determining, if the device is one of suited to provide fingerprint information and unsuited to provide fingerprint information, and causing response information to be transmitted (via communication interface unit 514).

Alternatively, Unit 510 comprises at least one processor 511 and at least one memory 512 including computer program code, the at least one memory 512 and the computer program code configured to, with the at least one processor 511, cause apparatus 51 at least to perform the method of FIG. 2 (and for instance also one or more of its further features that will be discussed below). Apparatus 51 is then in particular caused to perform the actions of obtaining query information, determining, if the device is one of suited to provide fingerprint information and unsuited to provide fingerprint information, and transmitting response information (via communication interface unit 514).

The memory 512 comprises a computer program code related to a device suitability check. The computer program code thus represents an example embodiment of a computer program according to the second aspect of the invention, e.g. a computer program that when executed by processor 511 causes unit 510 to perform the actions of the method of FIG. 2, in particular the actions of obtaining query information, determining, if the device is one of suited to provide fingerprint information and unsuited to provide fingerprint information, and causing response information to be transmitted (by controlling communication interface unit 514), or a computer program that when executed by processor 511 causes apparatus 51 to perform the actions of the method of FIG. 2, in particular the actions of obtaining query information, determining, if the device is one of suited to provide fingerprint information and unsuited to provide fingerprint information, and transmitting response information.

Unit 510 then is also an example embodiment of an apparatus that is configured to perform or comprises respective means for performing the method of FIG. 2 (and for instance also one or more of its further features that will be discussed below). The processor 511 of unit 510 may for instance represent means for performing the method of FIG. 2. Unit 510 may thus for instance comprise means for obtaining query information, means for determining, if the device is one of suited to provide fingerprint information and unsuited to provide fingerprint information, and means for causing response information to be transmitted. These means may be represented by different functional modules or different circuitry of processor 511, or may at least partially or entirely be represented by the same functional modules or the same circuitry.

As already stated, also apparatus 51 of FIG. 5b constitutes an example embodiment of an apparatus according to the second aspect of the invention.

Apparatus 51 comprises at least one processor 511 and at least one memory 512 including computer program code, the at least one memory 512 and the computer program code configured to, with the at least one processor 511, cause apparatus 51 at least to perform the method of FIG. 2 (and for instance also one or more of its further features that will be discussed below). Apparatus 51 is then in particular caused to perform the actions of obtaining query information, determining, if the device is one of suited to provide fingerprint information and unsuited to provide fingerprint information, and transmitting response information.

Apparatus 51 then is also an example embodiment of an apparatus that is configured to perform or comprises respective means for performing the method of FIG. 2 (and for instance also one or more of its further features that will be discussed below). The processor 511 of apparatus 51 may for instance represent means for performing the method of FIG. 2. Apparatus 51 may thus for instance comprise means for obtaining query information, means for determining, if the device is one of suited to provide fingerprint information and unsuited to provide fingerprint information, and means for transmitting response information.

With respect to the apparatuses of FIGS. 4a, 4b, 5a and 5b, some or all of their memories 401, 412, 501 and 512 may also be included into the respective processor 400, 411, 500 and 511. These memories may for instance be fixedly connected to their respective processor, or be at least partially removable from their respective processor, for instance in the form of a memory card or stick. The memories may for instance be non-volatile memories. They may for instance be a FLASH memory (or a part thereof), any of a ROM, PROM, EPROM and EEPROM memory (or a part thereof) or a hard disc (or a part thereof), to name but a few examples. The memories may also comprise an operating system for their respective processor. The memories may also comprise respective firmware for the respective apparatuses the memories are comprised in. The memories may for instance comprise a first memory portion that is fixedly installed in the respective apparatus, and a second memory portion that is removable from the respective apparatus, for instance in the form of a removable SD memory card. In the apparatuses of FIGS. 4a, 4b, 5a and 5b, further a main memory may be present, for instance in the form of a volatile memory. It may for instance be a Random Access Memory (RAM) or Dynamic RAM (DRAM), to give but a few non-limiting examples. It may for instance be used as a working memory for the respective processor when executing an operating system and/or computer programs.

The processors of the apparatuses of FIGS. 4a, 4b, 5a and 5b (and also any other processor mentioned in this specification) may be processors of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function. The processors of the apparatuses of FIGS. 4a, 4b, 5a and 5b may for instance be application processors that run an operating system.

Some or all of the components of the apparatuses of FIGS. 4a, 4b, 5a and 5b may for instance be connected via a bus. Some or all of the components of the apparatuses of FIGS. 4a, 4b, 5a and 5b may for instance be combined into one or more modules.

Figure 6:
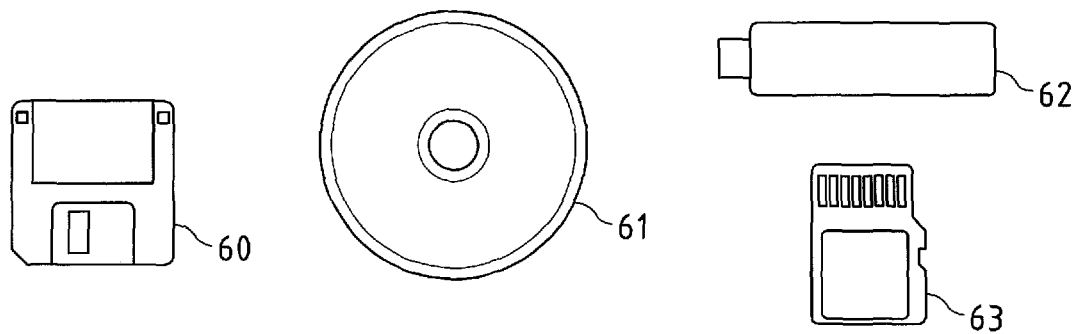
FIG. 6 is a schematic illustration of example embodiments of computer readable storage media according to the first and second aspect of the invention.

FIG. 6 illustrates example embodiments of computer-readable storage media 60-63 according to the first and second aspect of the invention. The computer readable storage media respectively store a computer program that, when executed by a processor, cause an apparatus to perform the method of FIG. 1 or FIG. 2 (and for instance also one or more of its further features that will be discussed below). The computer readable storage media are exemplarily removable and/or portable. As examples are depicted, a magnetic disc 60, an optical disc 61 (e.g. a Digital Versatile Disc (DVD)), a semiconductor memory stick 62 (e.g. a Universal Serial Bus (USB) stick) and a semiconductor memory card 63 (e.g. an SD-Card).

In the following, further details of the above-presented example embodiments of methods according to the first aspect (see FIG. 1) and the second aspect (see FIG. 2) of the invention, and also further example embodiments, will described. This description shall be understood to equally apply to the above-presented example embodiments of apparatuses, computer programs and computer readable media according to the first and second aspect of the invention and to the above-presented example embodiment of a system according to the invention.

As has become apparent, the method of FIG. 1 may for instance be performed by an apparatus (e.g. a processor) that may for instance be a part of the device for which the suitability to provide fingerprint information is determined, or may be integrated with this device in a further apparatus. The device may for instance be a mobile device, e.g. a mobile phone. The method may either transmit query information (in case the apparatus is capable of transmitting query information) or cause query information to be transmitted (e.g. by a component that is external to the apparatus). The transmission may for instance take place at least partially via a wireless connection, e.g. via a wireless communication system such as for instance a cellular or non-cellular communication system. The query information is destined for a query-processing apparatus, e.g. a server. The query information may for instance be transmitted together with a query, or may constitute the query itself. The query information may be transmitted in a dedicated query message, or may for instance be sent together with other information (e.g. piggy-backed). From the query-processing apparatus, in response to the query information, response information is obtained. This response information is transmitted by the query-processing apparatus and is destined for the device. The response information is obtained by the apparatus, and is for instance evaluated. For instance, if the information comprised in the response information indicates that the device has been determined to be suited to provide fingerprint information (e.g. in general, or only with respect to one or more different types of fingerprint information), the fingerprint information (e.g. in general, or only with respect to the one or more different types of fingerprint information for which the device has been determined to be suited) is (e.g. automatically) provided (in case the apparatus is capable of providing fingerprint information itself), or provision of fingerprint information is (e.g. automatically) caused (in case the apparatus is not capable of providing fingerprint information). Otherwise, no fingerprint information may for instance be provided or caused to be provided. Alternatively, the information comprised in the response information may be displayed to a user of the device, for instance to enable the user to decide if fingerprint information shall be provided by the device or not. The user may then for instance manually configure his/her device accordingly, e.g. activate or deactivate a process for collecting and/or providing fingerprint information. The fingerprint information comprises information on at least one radio node and/or on at least one cell observed (e.g. by the device, or by a component thereof, e.g. a GNSS receiver) at at least one position of the device (and for instance also information on the at least one position of the device). The fingerprint information may for instance comprise respective information on one or more radio nodes and/or cells observed at one position of the device, and for instance also information on the position of the device. The fingerprint information may for instance comprise respective information on more than one position, and for each position, respective information on one or more radio nodes and/or cells observed at this position. The fingerprint information may be of at least two different types. The at least two different types may for instance pertain to a type of the at least one radio node and/or cell on which the fingerprint information contains information. The fingerprint information may for instance be provided to a unit that generates and/or updates radiomaps at least based on the fingerprint information. The fingerprint information may then for instance be provided or caused to be provided for a pre-defined time period or for a pre-defined number of times. Alternatively, the fingerprint information may then for instance be provided or caused to be provided until, in response to another query, response information is obtained that indicates that the device (now) has been determined to be unsuited to provide fingerprint information. Fingerprint information may for instance be provided by executing a software, e.g. a fingerprint collection and/or provision software. Computer program code that implements the actions of FIG. 1 may for instance be part of a software for providing fingerprint information, and may for instance call instructions for providing fingerprint information of this software if the information contained in the response information indicates that the device has been determined to be suited to provide fingerprint information.

The method of FIG. 2 may also be performed by an apparatus (e.g. a processor), e.g. a query-processing apparatus (e.g. a server). The query information transmitted or caused to be transmitted by the apparatus that performs the method of FIG. 1 is obtained (e.g. received) at the apparatus that performs the method of FIG. 2. This apparatus then determines if the device is one of suited or unsuited to provide fingerprint information (e.g. in general, or with respect to one or more different types of fingerprint information). This determining may for instance be based on whitelists and/or blacklists, as will be further described below. Alternatively, if the at least one property of the device for which information is contained in the query information does for instance quantify a technical characteristic of the device, e.g. a GNSS positioning accuracy or signal reception sensitivity, such a property may be compared against a pre-defined threshold in the apparatus that performs the method of FIG. 2. For instance, if the property is a GNSS positioning accuracy of the device, and if the information on this property contained in the query information is e.g. 10 m, this value may be compared against a pre-defined threshold of e.g. 15 m, and the device may then be considered to be suited to provide fingerprint information. Information on the results of the determining is then included into response information, and this response information is transmitted (if the apparatus that performs the method of FIG. 2 is capable of transmitting information) or caused to be transmitted (if the apparatus that performs the method of FIG. 2 is not by itself capable to transmit information) to the apparatus that performs the method of FIG. 1.

In this way, devices that are considered or classified to be unsuited to provide fingerprint information (e.g. in general, or with respect to one or more different types of fingerprint information) may for instance be excluded from the provision of fingerprint information (e.g. in general, or only with respect to the one more different types of fingerprint information). The decision which device is considered or classified as suited/unsuited to provide fingerprint information (e.g. which type of fingerprint information) is made by the apparatus that performs the method of FIG. 2. This decision may for instance be based on information that can be changed (e.g. updated), such as for instance a threshold as described above or a database of devices (and their properties) that are classified as suited or unsuited as will be described below.

To ensure that a device that is considered unsuited to provide fingerprint information (e.g. in general, or with respect to one or more different types of fingerprint information) does not provide fingerprint information (e.g. in general, or fingerprint information of the one or more different types of fingerprint information), the query to the query-processing apparatus and the obtaining of a positive response information (i.e. a response information with information indicating that the device has been determined to be suited to provide fingerprint information (e.g. in general, or only with respect to the one or more different types of fingerprint information)) may be made a mandatory action for the device before any fingerprint information can be provided. For instance, the actions of the method of FIG. 1 may be integrated into a fingerprint collection and/or provision software used by the device to provide fingerprint information, and instructions for providing (and perhaps also instructions for collecting) fingerprint information may only be called if the response information contains the information that the device has been determined to be suited to provide fingerprint information (e.g. in general, or only with respect to the one or more different types of fingerprint information). Manipulation of this software may then for instance be avoided by signing the software with a signature (e.g. an encrypted hash over the software) and allowing the software to be executed only when the signature of the software can be verified. Alternatively, e.g. if the program that implements the actions of the method of FIG. 1 is not part of the fingerprint collection and/or provision software, it may for instance be necessary, to be able to execute the fingerprint collection and/or provision software, to have information that is only contained in the response information if it has been determined that the device is suited to provide fingerprint information. For instance, the fingerprint collection and/or provision software may be encrypted with a first cryptographic key and may only be executable after decryption with a second cryptographic key (which may be the same as the first key in case of a symmetric key pair or may be different in case of an asymmetric key pair), which may be included in the response information but only when it has been determined that the device is suited to provide fingerprint information.

In example embodiments of the invention, the method of FIG. 1 further comprises providing fingerprint information or causing fingerprint information to be provided, if the information comprised in the response information indicates that the device has been determined to be suited to provide fingerprint information. In particular, fingerprint information may only be provided or caused to be provided, if the information comprised in the response information indicates that the device has been determined to be suited to provide fingerprint information.

In example embodiments of the invention, in the method of FIG. 1, there exists fingerprint information of at least two different types, and the information comprised in the response information indicates for which one or more types of the at least two different types of fingerprint information the device has been determined to be one of suited and unsuited to provide fingerprint information. Examples for various types of fingerprint information have already been presented above.

The method of FIG. 1 may then for instance further comprise (e.g. only) providing or causing to be provided fingerprint information of the one or more types, if the information comprised in the response information indicates that the device has been determined to be suited to provide fingerprint information of these one or more types.

In example embodiments of the invention, in the methods of FIG. 1 and FIG. 2, the information on at least one property of the device comprises at least one of information on a manufacturer of the device, information on a model of the device, information on a version of at least one hardware component of the device and information on a software of the device. Therein, the information on the software of the device may for instance comprise at least one of information on a firmware of the device, information on an operating system of the device and information on a computer program for at least one of collecting and providing fingerprint information of the device. The information on the software of the device may for instance comprise at least one of information on a version of the software and information on a name of the software.

Already information on one or more of these properties may allow a founded decision if a device is suited or unsuited to provide fingerprint information (e.g. in general, of with respect to one or more different types of fingerprint information). For instance, information on a manufacturer and information on a model of a device may already give a good impression of the hardware and software of the device that affect the quality of the fingerprint information (e.g. in general, of with respect to one or more different types of fingerprint information). This impression may for instance further be detailed by adding information on the firmware, the operating software or other software, in particular the fingerprint collection and/or provision software.

In example embodiments of the invention, in the methods of FIG. 1 and FIG. 2, the information on the at least one property of the device is in the eXtensible Markup Language (XML) format. This allows for a rather flexible and extensible syntax for the query information.

In example embodiments of the invention, in the methods of FIG. 1 and FIG. 2, the information on the at least one property of the device comprises information on a manufacturer of the device, information on a model of the device and information on a version of a firmware of the device.

An example of the information on these three properties (exemplarily in XML format) then takes the following form:

```
<manufacturer>Nokia</manufacturer>
<model>RM-892</model>
<firmware>3.4.3.5</firmware>
```

In example embodiments of the invention, in the methods of FIG. 1 and FIG. 2, a database comprises, for one or more devices that are classified as suited to provide fingerprint information (e.g. in general, of with respect to one or more different types of fingerprint information, respectively), respective information representative of at least one respective property the respective device has, and/or comprises, for one or more devices that are classified as unsuited to provide fingerprint information (e.g. in general, of with respect to one or more different types of fingerprint information, respectively), respective information representative of at least one respective property the respective device has, and the device is determined to be one of suited to provide fingerprint information and unsuited to provide fingerprint information based at least on the information on the at least one property of the device comprised in the transmitted query information and on information comprised in the database.

The database may for instance be stored in a memory or storage accessible by the apparatus that performs the method of FIG. 2. The database may for instance be stored in memory 517 of FIG. 5b.

The database may for instance comprise information for devices classified as suited to provide fingerprint information and no information for devices classified as unsuited to provide fingerprint information. The database may then be considered to comprise a "whitelist" of devices and their respective property or properties. Alternatively, the database may for instance comprise information for devices classified as unsuited to provide fingerprint information and no information for devices classified as suited to provide fingerprint information. The database may then be considered to comprise a "blacklist" of devices and their respective property or properties. Also a mixture of whitelist and blacklist information is possible. A whitelist may for instance be advantageous if only explicitly classified devices shall be allowed to provide fingerprint information (rather than basically allowing all devices to provide fingerprint information and excluding only the devices from the blacklist). This gives precise control over the devices contributing to the fingerprint provision process and e.g. avoids scenarios where new low-quality, that are not yet listed on the blacklist, start providing their low-quality fingerprint information and thus deteriorate the quality of the radiomaps that are generated based on the fingerprint information.

As already stated, the information in the database may, in case that there exist at least two different types of fingerprint information, pertain to these at least two different types of fingerprint information, respectively. There may thus at least be information in the database pertaining to a first type of fingerprint information, and information in the database pertaining to a second type of fingerprint information. The determination whether a device is suited or unsuited to provide fingerprint information can then be performed on an fingerprint-information-type-basis.

Consequently, references to the term "fingerprint information" shall be understood in the following as references to either fingerprint information in general (e.g. if no differentiation between different types of fingerprint information exists or is made), or to a respective type of at least two different types of fingerprint information (e.g. if there exist at least two different types of fingerprint information).

The classification of the devices may for instance at least partially be based on tests performed with the devices. For instance, a quality of the fingerprint information (e.g. in terms of accuracy of the fingerprint information) provided by a device may be assessed, for instance by determining a deviation of the fingerprint information from reference fingerprint information that is considered to be highly accurate, and depending on the assessed quality (e.g. if the deviation exceeds a pre-defined threshold), the device may be classified as suited or unsuited to provide fingerprint information, and according information may be included for this device into the database. Tests may additionally or alternatively be performed on the fingerprint information itself (e.g. without referring to reference data). For instance, errors concerning the proper reporting of radio node/cell identifiers may be detectable by analyzing several subsequent sets of fingerprint information provided by a device, e.g. by checking if identifiers of different types (e.g. a globally unique identifier and a locally unique identifier) contained in the sets of fingerprint information pertain to the same radio node/cell or not, which can for instance be detected if only one of them changes, but not the other one, or by checking if a radio node/cell identifier in the sets of fingerprint information maintains the same although associated information on the positions (which may also be contained in the fingerprint information) changes to a degree that indicate that the coverage area of the radio node/cell is likely to have been left (e.g. if the positions lie in an area that is larger than the average coverage area size to be expected for such a radio node/cell, e.g. a WLAN access point or cellular communication system cell).

The respective information representative of at least one respective property the respective device has may, in case of more than one property of a device, be representative of each property separately (e.g. may be property-specific information), or may be representative of all properties taken together.

In the database, the information representative of at least one respective property the respective device has may for instance represent a range of values or a single value. For instance, for a device that is classified as suited to provide fingerprint information, information representative of a property the device has may for instance be: "firmware in the range from 3.4.3.1 to 3.4.3.5". For instance, the information representative of at least two of the at least one respective property the respective device has may for instance respectively represent a range of values. For instance, for a device that is classified as suited to provide fingerprint information, information representative of properties the device has may for instance be: "firmware in the range from 3.4.3.1 to 3.4.3.5", "operating system version in the range from 0.5 to 0.9".

The information in the database may for instance at least partially (or entirely) be updateable, for instance to account for new devices.

In example embodiments of the invention, in the methods of FIG. 1 and FIG. 2 and in case that the above-described database is used, it is determined that the device is one of suited to provide fingerprint information and unsuited to provide fingerprint information by comparing information representative of the information on the at least one property of the device comprised in the transmitted query information with the respective information that is comprised in the database and is representative of at least one respective property of at least one device that is classified as suited to provide fingerprint information and/or with the respective information that is comprised in the database and is representative of at least one respective property of at least one device that is classified as unsuited to provide fingerprint information.

Therein, it may for instance be determined that the device is suited to provide fingerprint information if information representative of the information on all properties of the at least one property of the device comprised in the transmitted query information matches information that is comprised in the database and is representative of all properties of the at least one property of a device that is classified as suited to provide fingerprint information, and/or it may for instance be determined that the device is unsuited to provide fingerprint information if information representative of the information on all properties of the at least one property of the device comprised in the transmitted query information matches information that is comprised in the database and is representative of all properties of the at least one property of a device that is classified as unsuited to provide fingerprint information.

Therein, the information representative of the information on all properties of the at least one property may for instance be the information on all properties of the at least one property, or a representation of the information on all properties of the at least one property. The information representative of the information on all properties of the at least one property may for instance be a hash code computed across the information on all properties of the at least one property.

Figure 7:
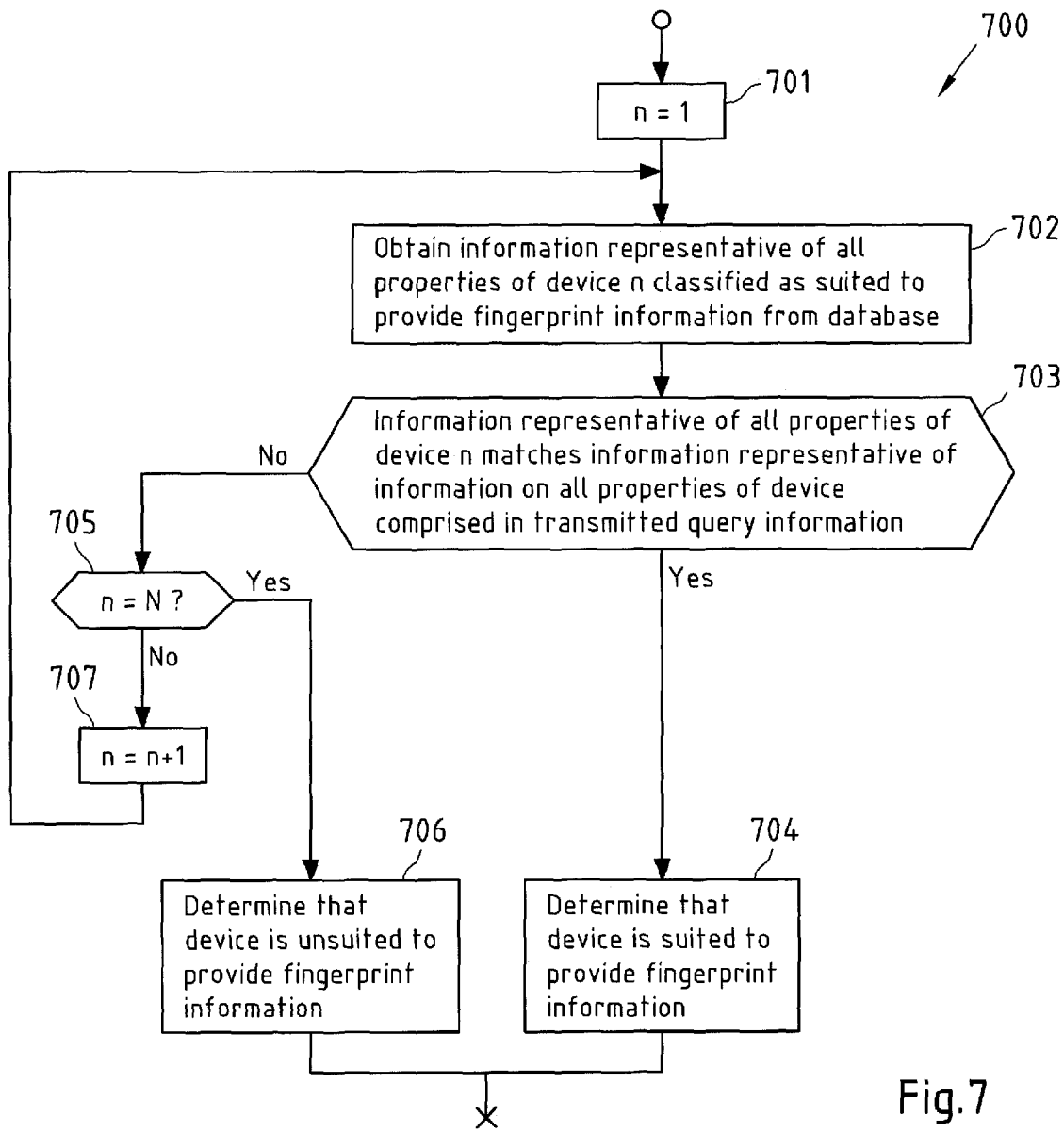
FIG. 7 is a flowchart illustrating an example embodiment of a method for determining if a device is suited or unsuited to provide fingerprint information according to the invention.

An example of such a determination process, which may for instance be performed in step 202 of FIG. 2, is presented as flowchart 700 of FIG. 7. For simplicity of presentation, it is exemplarily assumed here that the database comprises only a whitelist of devices that are classified as suited to provide fingerprint information. As described above, this flowchart can either be understood to pertain to fingerprint information in general, or to a respective type of at least two different types of fingerprint information.

In a first step 701, a counter variable n is initialized to 1. Counter variable n counts through all N devices classified as suited to provide fingerprint information contained in the database, wherein N is an integer number.

In step 702, for device n (e.g. n=1 in the first iteration of flowchart 700), information representative of all properties of device n is obtained from the database.

In step 703, it is then checked if the information representative of information on all properties of the device (for which it is to be determined if it is suited or unsuited to provide fingerprint information) comprised in the transmitted query information matches the information representative of all properties of device n. Therein, a match may for instance be found if an information equals the information against which it is compared, or if an information falls within a range defined by the information against which it is compared, to name but a few examples.

If a match is found in step 703, it is determined in step 704 that the device (for which it is to be determined if it is suited or unsuited to provide fingerprint information) is suited to provide fingerprint information, and the flowchart 700 ends.

If no match is found in step 703, it is checked in step 704 if already all N devices in the database that are considered to be suited to provide fingerprint information have been processed. If this is the case, it is determined in step 706 that the device (for which it is to be determined if it is suited or unsuited to provide fingerprint information) is unsuited to provide fingerprint information (since it is not comprised in the database), and the flowchart 700 ends. Otherwise, counter variable n is increased by one in step 707, and the flowchart 700 jumps back to step 702 to obtain the information for the next device.

Assuming that a database is used in connection with the methods of FIGS. 1 and 2, there exists a plurality of possibilities on how to store the information representative of the at least one respective property a respective device classified as suited/unsuited to provide fingerprint information in the database has. Some of these possibilities will now be discussed, wherein fingerprint information is again considered to comprise either to fingerprint information in general or to a respective type of at least two different types of fingerprint information:

In example embodiments of the invention, the respective information stored in the database and representative of at least one respective property the respective device has are comprised in the database as a list for the respective device, with each list element being respective information representative of a respective property. The list may for instance take the shape of a tuple of information on properties.

An example of such a list or tuple for a device is:
<information on property1, information on property2, information on property3>

A device is thus basically understood by the database as a certain (for instance) unique constellation of properties.

An even more concrete example may thus be the following list or tuple for a device:
<information on manufacturer, information on model, information on firmware>

In this case, an example of a database may then for instance look as follows (with lists or tuples for five different devices (with three properties) that are for instance considered suited to provide fingerprint information):

<Nokia, RM-892, 3.4.3.1>
<Nokia, RM-892, 3.4.3.2>
<Nokia, RM-892, 3.4.3.3>
<Nokia, RM-892, 3.4.3.4>
<Nokia, RM-892, 3.4.3.5>

Here, it can thus be seen that all five of these devices have the same manufacturer and model, but are nevertheless considered as five different devices since they have different firmware versions.

It is understood that then also the information on the at least one property of the device comprised in the query information may look for instance like one of the five lines above.

In example embodiments of the invention, the at least one respective property a respective device of the one or more devices has are at least two respective properties, and respective information representative of these at least two respective properties is comprised in the database as a respective hash code calculated over representations of the at least two respective properties (wherein the representations may either be the properties themselves, or other representations thereof in other formats, e.g. e.g. binary representations). Then instead of a list with information on the properties of a device, a hash code summarizes the properties of the device. The database may then, in the simplest case, only comprise a plurality of hash codes, each representative of the properties a device that is classified as suited or unsuited to provide fingerprint information has. Before being able to compare the information on the properties comprised in the transmitted query information, it may then be necessary to calculate a hash code over representations of these properties, so that the resulting hash code can be compared against the hash codes in the database. A match between hash codes may then be indicative of the device being suited to provide fingerprint information. This calculation of the hash code may for instance be performed as sub-step in step 703 of FIG. 7. It may of course also be possible to include a hash code as information on the properties of the device already in the query information before transmission to query-processing apparatus. This however adds additional computational complexity to the apparatus that performs the method of FIG. 1, e.g. device 2 of FIG. 3. The hash code may in particular have a shorter length than the information on the properties for the device would have (like for instance the list of properties discussed above). Various algorithms exist for creating a hash code, which are known to a person skilled in the art, e.g. Brent-hashing or Fowler-Noll-Vo-hashing. Using hash codes may allow a faster search for a matching property constellation of a device in the database.

In example embodiments of the invention, the at least one respective property a respective device of the one or more devices has are at least two respective properties, and respective information representative of these at least two respective properties is comprised in the database in a nested structure, with each respective information representative of a property being comprised in a different nesting stage of the nested structure, respectively.

An example of such a nested structure, for the exemplary case that there are three properties ("manufacturer", "model", "firmware" as exemplary representations of more general "property1", "property2" and "property3"), then looks as follows:

<manufacturer>
    <name>Nokia</name>
    <model>
        <code>RM-892</code>
        <firmware>3.4.3.1</firmware>
        <firmware>3.4.3.2</firmware>
        <firmware>3.4.3.3</firmware>
        <firmware>3.4.3.4</firmware>
        <firmware>3.4.3.5</firmware>
    </model>
    <model>
        <code>RM-890</code>
        <firmware>3.4.3.1</firmware>
        <firmware>3.4.3.2</firmware>
        <firmware>3.4.3.3</firmware>
        <firmware>3.4.3.4</firmware>
        <firmware>3.4.3.5</firmware>
    </model>
</manufacturer>
<manufacturer>
    <name>anotherManufacturer</name >
    <model>
        ...
    </model>
</manufacturer>

The nested structure may for instance support a faster search as compared to the list approach described above, and may keep the database human-readable as compared to the hash code approach described above. In contrast to the flowchart of FIG. 7, where information representative of the properties of each device are obtained on a device-by-device basis, it may be more efficient to lock on the information on the first property of the device comprised in the query information, to determine a match on the first nesting stage ("manufacturer"), and if there is a match, to lock on the information on the second property of the device comprised in the query information, to determine a match on the second nesting stage ("model"), and then to lock on the information on the third property of the device comprised in the query information and to determine a match on the third nesting stage ("firmware").

The nested structure above may for instance be considered as an example of information contained in the database with respect to a first type of fingerprint information, e.g. a device that shall be determined to be suited to provide this first type of fingerprint information would have to have properties as contained in the nested structure. A similar nested structure may then for instance exist in the database with respect to a second type of fingerprint information.

In example embodiments of the invention, the at least one respective property a respective device of the one or more devices has are at least two respective properties, and respective information representative of these at least two respective properties is comprised in the database in a tree structure, with each respective information representative of a property being comprised in a different hierarchical level of the tree structure. The tree structure may for instance have a similar hierarchical structure as compared to the nested structure described above, i.e. have a first property (e.g. "manufacturer") at the root (first hierarchical level) of the tree, then a second property (e.g. "model") as child nodes of the root (second hierarchical level), a third property (e.g. "firmware") as child nodes of the second-property-nodes (third hierarchical level, and so on. Here, also a more structured and thus possibly quicker search as in the list approach is possible.

In example embodiments of the invention, a device is classified as at least one of suited and unsuited to provide fingerprint information in dependence on at least a quality of fingerprint information provided by the device. This classification of a device as being suited or unsuited to provide fingerprint information is reflected by the database. The quality of fingerprint information may for instance be determined based on tests conducted with devices (or only components of the devices that are known to affect the quality of the fingerprint information). Quality may for instance comprise accuracy (e.g. of information on a position that may be comprised in the fingerprint information and/or of the radio node/cell identification information) and/or sensitivity (e.g. that even far-apart radio nodes and/or cells associated with far-apart radio nodes are still reliably observed). A device may for instance be classified as suited to provide fingerprint information if tests revealed that it has a fingerprint information quality above a pre-defined level, wherein the level may for instance be expressed by one or more pre-defined thresholds (e.g. one threshold for accuracy, and another threshold for sensitivity).

In example embodiments of the invention, the database is subject to updating. Updating may for instance be required to extend the control on which device is allowed to provide fingerprint information and which is not allowed to provide fingerprint information to new devices.

In example embodiments of the invention, the XML format may be used for formatting the response information.

In XML, the response information may for instance look like:
<response>suited</response>
or
<response>unsuited</response>

Instead of suited/unsuited, also the pair ok/nok could be used.

Furthermore, if at least two different types of fingerprint information exists, the response information may for instance contain information on the suitability of the device for each of these different types of fingerprint information, e.g. in the form (if three different fingerprint information types exist):
WLAN type ok/nok
Serving cellular type ok/nok
Neighbor cellular type ok/nok In example embodiments of the invention, the response information (see step 102 of FIG. 1 and step 203 of FIG. 2) further comprises information to be considered for a process of transmitting query information or causing query information to be transmitted and/or for a process of providing fingerprint information or causing fingerprint information to be provided. For instance, the response information may comprise information specifying when the next query information has to be transmitted (for instance has to be transmitted at the latest), as an example for information comprised in the response information to be considered for a process of transmitting query information. This information may for instance be chosen in correspondence to an update cycle of the database that comprises the information on the devices that are classified as suited or unsuited to provide fingerprint information. Having frequency of transmitting query information (and thus of querying whether the device is still classified as suited or unsuited to provide fingerprint information) that is much higher than the (e.g. average) frequency of updating the database may cause unnecessary query-response cycles, since the information in the database may likely not have changed. It may nevertheless be possible for the apparatus that performs the method of FIG. 1 to transmit a query information before a time instant specified by the response information, to allow the apparatus to have the suitability of the device re-checked in case that the properties of the device have changed (e.g. in case of new firmware due to a firmware update). An example of information comprised in the response information and to be considered for a process of providing fingerprint information or causing fingerprint information to be provided is a parameter for this process, such as for instance a maximum number of fingerprint information sets to be provided (for instance per a time unit such as for instance per minute, hour or day).

In example embodiments of the invention, the query information is transmitted (see step 101 of FIG. 1) according to a schedule. The schedule may for instance be a regular schedule. Non-limiting examples of time intervals between transmissions of query information in such a regular schedule are 1 day, 5 days, 1 week, four weeks or a month. As described above, checking from time-to-time if the device is still considered suited or unsuited to provide fingerprint information takes into account that the properties of the device and/or the database may have changed in the meantime. The schedule may at least prescribe when the next query information is (or has to be) transmitted. The schedule may for instance be pre-defined, but may be changeable by signaling. For instance, the time instant for the next transmission of query information may be signaled in the response information obtained in response to the current query information. The schedule may for instance define when the apparatus that performs the method of FIG. 1 has to transmit the query information/cause query information to be transmitted at the latest. It may for instance be prescribed (e.g. by including according instructions into the computer fingerprint collection and/or provision software) that the query information has to be transmitted according to the schedule.

In example embodiments of the invention, the query information is transmitted (see step 101 of FIG. 1) in response to a change of at least one property of the at least one property of the device. A change of at least one property of a device (e.g. a change of the firmware) may change the suitability status of the device, so that is it beneficial to have the suitability checked as soon as possible. For instance, the change of the at least one property may lead a device that has been determined suited to provide fingerprint information to become a device that is determined unsuited to provide fingerprint information, so that this device should be excluded from providing fingerprint information as soon as possible. It may for instance be prescribed (e.g. by including according instructions into the computer fingerprint collection and/or provision software) that the query information has to be transmitted each time any property is changed, or each time one or more properties of a pre-defined set of properties are changed. The at least one property of the at least one property may for instance be a property of a pre-defined set of properties the change of which shall trigger the transmission of the query information.

In example embodiments of the invention, the query information is transmitted according to a schedule and additionally in response to a change of at least one property of the at least one property of the device. This embodiment constitutes a combination of the previous two embodiments and achieves the technical effects of both previously presented embodiments. Also the details described with respect to the previous two embodiments shall be applicable here. Again, it may for instance be prescribed (e.g. by including according instructions into the computer fingerprint collection and/or provision software) that the query information has to be transmitted according to the schedule and additionally in response to a change of at least one property of the at least one property of the device.

In these examples embodiments directed to when the query information is transmitted, it may be required that, once query information has been transmitted, to receive response information that indicates that the device has been determined to be suited to provide fingerprint information. Otherwise, it may for instance not be possible to provide fingerprint information, even if fingerprint information was provided before the query transmission information has been transmitted. For instance, the fingerprint collection and/or provision process may be suspended each time when query information is transmitted, and can only be resumed when the response information with the information that the device has been determined suited to provide fingerprint information has been obtained in response to the query information.

Figure 8:
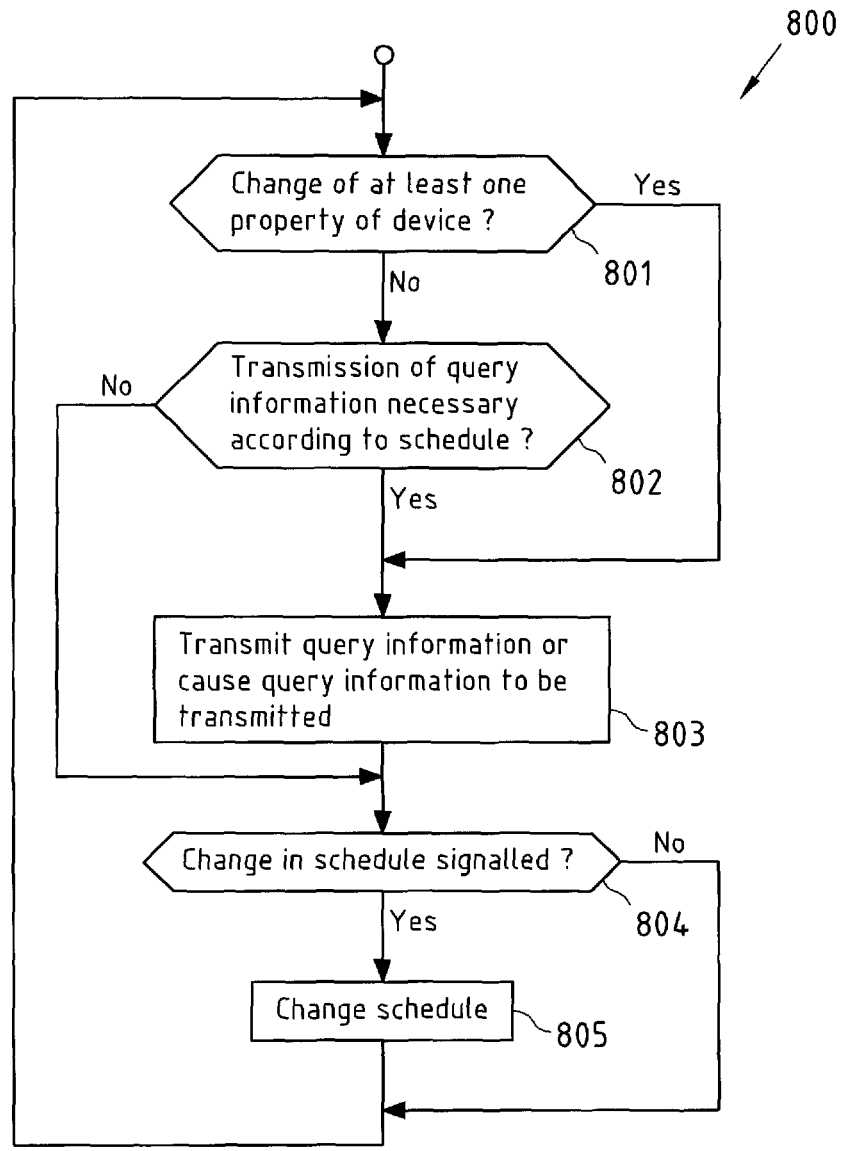
FIG. 8 is a flowchart illustrating an example embodiment of a method for checking if transmission of query information is required according to invention.

FIG. 8 is a flowchart 800 of an example embodiment of a method for checking if transmission of query information is required according to the invention, similar to the example embodiment described before. This method may for instance be started when a fingerprint collection and/or provision software is started (e.g. as a part thereof). This method may for instance run as a background process on a device that is to provide fingerprint information.

In a first step 801, it is checked if at least one property of the device has changed (e.g. a firmware version or a hardware driver version). If at least one property has changed, or if at least one property of a pre-defined set of properties of the device, which properties are considered to have an effect on the quality of fingerprint information produced by the device, the flowchart jumps to step 803, in which query information is transmitted or caused to be transmitted, as in step 101 of FIG. 1. Step 803 may for instance be understood to comprise all steps of the flowchart 100 of FIG. 1.

If the check in step 801 reveals that no property has changed, the flowchart proceeds to step 802 and checks if transmission of query information is necessary according to a schedule. The schedule may for instance at least prescribe when the next transmission of query information is necessary. It may for instance be a regular schedule, which prescribes that query information has to be transmitted at the latest e.g. 1 week after the last transmission of query information (of course other pre-defined time intervals are possible). If it is found in step 802, for instance by comparing a time obtained from a local clock against the schedule, that transmission of query information is required, step 803 is executed as described above. Otherwise, the flowchart jumps to step 804 and checks whether a change in the schedule has been signaled. A change in the schedule may for instance be signaled in response information that is obtained in response to the query information. The change in the schedule may for instance be signaled by including information into the response information indicating when the next query information shall be transmitted, which may change a previously existing schedule. If a change in the schedule has been signaled, the schedule is changed accordingly in step 805, e.g. by replacing the previous time instant for the next transmission of query information by the signaled time instant. Then, and also in case that the check in step 804 reveals that no change in the schedule has been signaled, the flowchart steps back to step 801.

In the present specification, any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted. The sequence of all method steps presented above is not mandatory, also alternative sequences may be possible.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause an apparatus at least to perform:
   one of transmitting query information or causing query information to be transmitted that relates to a mobile device, wherein the query information comprises information on at least one property of the mobile device including information regarding at least one of a manufacturer, a model, a version of a hardware component, software or technical characteristics of the mobile device,
   obtaining response information, wherein the response information comprises information indicating that the mobile device has been determined to be one of suited to provide fingerprint information or unsuited to provide fingerprint information based on a quality of the fingerprint information in terms of an accuracy of the fingerprint information to be provided by the mobile device, wherein the quality of the fingerprint information is based at least on the information on the at least one property of the mobile device comprised in the transmitted query information, wherein fingerprint information comprises: (i) information on at least one radio node and/or on at least one cell observed at at least one position of the mobile device and (ii) information on the at least one position of the mobile device when the at least one radio node and/or the at least one cell is observed, the information on the at least one position of the mobile device being based at least on information from one or more of a Global Navigation Satellite System (GNSS) receiver or a map,
   wherein information on the at least one radio node or the at least one cell that are observed at at least one position of the mobile device comprises an identifier of the at least one radio node or the at least one cell and one or more of a received signal strength, a pathloss or Timing Advance or Round-Trip Time measurements performed by the mobile device; and
   in an instance in which the response information indicates that the mobile device is suitable to provide fingerprint information, providing fingerprint information or causing fingerprint information to be provided by the mobile device.

2. The apparatus according to claim 1 wherein there exists fingerprint information of at least two different types including fingerprint information that pertains to: (i) a type of the at least one radio node or the at least one cell being cellular or non-cellular or (ii) a status of the at least one radio node or the at least one cell being a serving status or a neighbor status, and wherein the information comprised in the response information indicates that the device has been determined to be suited to provide one type of fingerprint information and separately indicates that the device has been determined to be unsuited to provide fingerprint information relating to a different type of fingerprint information.

3. The apparatus according to claim 1, wherein the response information further comprises information to be considered for a process of transmitting query information or causing query information to be transmitted and/or for a process of providing fingerprint information or causing fingerprint information to be provided.

4. The apparatus according to claim 1, wherein one of the following holds:
   the query information is transmitted according to a schedule,
   the query information is transmitted in response to a change of at least one property of the at least one property of the device, or
   the query information is transmitted according to a schedule and additionally in response to a change of at least one property of the at least one property of the device.

5. An apparatus comprising at least one processor and at least one memory including computer program code, the at least one memory and the computer program code configured to, with the at least one processor, cause an apparatus at least to perform:
   obtaining query information, wherein the query information comprises information on at least one property of a mobile device including information regarding at least one of a manufacturer, a model, a version of a hardware component, software or technical characteristics of the mobile device,
   determining that the mobile device is one of suited to provide fingerprint information or unsuited to provide fingerprint information based on a quality of the fingerprint information in terms of an accuracy of the fingerprint information to be provided by the mobile device, wherein the quality of the fingerprint information is based at least on the information on the at least one property of the mobile device comprised in the query information, wherein fingerprint information comprises: (i) information on at least one radio node and/or on at least one cell observed at at least one position of the mobile device and (ii) information on the at least one position of the mobile device when the at least one radio node and/or the at least one cell is observed, the information on the at least one position of the mobile device being based at least on information from one or more of a Global Navigation Satellite System (GNSS) receiver or a map,
   wherein information on the at least one radio node or the at least one cell that are observed at at least one position of the mobile device comprises an identifier of the at least one radio node or the at least one cell and one or more of a received signal strength, a pathloss or Timing Advance or Round-Trip Time measurements performed by the mobile device; and
   wherein determining that the mobile device is one of suited to provide fingerprint information or unsuited to provide fingerprint information comprises at least one of comparing the information on at least one property of the mobile device to properties of mobile devices from a list of mobile devices suited to provided fingerprint information and their respective properties, or comparing the information on at least one property of the mobile device to properties of mobile devices from a list of mobile devices unsuited to provided fingerprint information, and one of transmitting response information or causing response information to be transmitted to the mobile device.

6. The apparatus according to claim 5, wherein a database comprises, for one or more devices that are classified as suited to provide fingerprint information, respective information representative of at least one respective property the respective device has, and/or comprises, for one or more devices that are classified as unsuited to provide fingerprint information, respective information representative of at least one respective property the respective device has, and wherein the device is determined to be one of suited to provide fingerprint information and unsuited to provide fingerprint information based at least on the information on the at least one property of the device comprised in the query information and on information comprised in the database.

7. The apparatus according to claim 6, wherein it is determined that the device is one of suited to provide fingerprint information and unsuited to provide fingerprint information by comparing information representative of the information on the at least one property of the device comprised in the query information with the respective information that is comprised in the database and is representative of at least one respective property of at least one device that is classified as suited to provide fingerprint information and/or with the respective information that is comprised in the database and is representative of at least one respective property of at least one device that is classified as unsuited to provide fingerprint information.

8. The apparatus according to claim 6, wherein it is determined that the device is suited to provide fingerprint information if information representative of the information on all properties of the at least one property of the device comprised in the query information matches information that is comprised in the database and is representative of all properties of the at least one property of a device that is classified as suited to provide fingerprint information, and/or wherein it is determined that the device is unsuited to provide fingerprint information if information representative of the information on all properties of the at least one property of the device comprised in the query information matches information that is comprised in the database and is representative of all properties of the at least one property of a device that is classified as unsuited to provide fingerprint information.

9. The apparatus according to claim 6, wherein one of the following holds:

the respective information representative of at least one respective property the respective device has are comprised in the database as a list for the respective device, with each list element being respective information representative of a respective property;

the at least one respective property a respective device of the one or more devices has are at least two respective properties, and wherein respective information representative of these at least two respective properties is comprised in the database in a nested structure, with each respective information representative of a property being comprised in a different nesting stage of the nested structure, respectively;

the at least one respective property a respective device of the one or more devices has are at least two respective properties, and wherein respective information representative of these at least two respective properties is comprised in the database in a tree structure, with each respective information representative of a property being comprised in a different hierarchical level of the tree structure; or the at least one respective property a respective device of the one or more devices has are at least two respective properties, and wherein respective information representative of these at least two respective properties is comprised in the database as a respective hash code calculated over representations of the at least two respective properties.

10. The apparatus according to claim 6, wherein the database is subject to updating.

11. The apparatus according to claim 5, wherein the response information further comprises information to be considered for a process of transmitting query information or causing query information to be transmitted and/or for a process of providing fingerprint information or causing fingerprint information to be provided.

12. The apparatus according to claim 5, wherein one of the following holds:

the query information is transmitted by the device according to a schedule, the query information is transmitted by the device in response to a change of at least one property of the at least one property of the device, or the query information is transmitted by the device according to a schedule and additionally in response to a change of at least one property of the at least one property of the device.

13. A method comprising:

obtaining query information, wherein the query information comprises information on at least one property of a mobile device including information regarding at least one of a manufacturer, a model, a version of a hardware component, software or technical characteristics of the mobile device, determining that the mobile device is one of suited to provide fingerprint information or unsuited to provide fingerprint information based on a quality of the fingerprint information in terms of an accuracy of the fingerprint information to be provided by the mobile device, wherein the quality of the fingerprint information is based at least on the information on the at least one property of the mobile device comprised in the obtained query information, wherein fingerprint information comprises: (i) information on at least one radio node and/or on at least one cell observed at at least one position of the mobile device and (ii) information on the at least one position of the mobile device when the at least one radio node and/or the at least one cell is observed, the information on the at least one position of the mobile device being based at least on information from one or more of a Global Navigation Satellite System (GNSS) receiver or a map, wherein information on the at least one radio node or the at least one cell that are observed at at least one position of the mobile device comprises an identifier of the at least one radio node or the at least one cell and one or more of a received signal strength, a pathloss or Timing Advance or Round-Trip Time measurements performed by the mobile device; and wherein determining that the mobile device is one of suited to provide fingerprint information or unsuited to provide fingerprint information comprises at least one of comparing the information on at least one property of the mobile device to properties of mobile devices from a list of mobile devices suited to provided fingerprint information and their respective properties, or comparing the information on at least one property of the mobile device to properties of mobile devices from a list of mobile devices unsuited to provided fingerprint information, and one of transmitting response information or causing response information to be transmitted to the mobile device.

14. The method according to claim 13, wherein the response information comprises information indicating that the mobile device has been determined, based at least on the information on the at least one property of the device comprised in the query information, to be one of suited to provide fingerprint information or unsuited to provide fingerprint information.

15. The apparatus according to claim 5, wherein the response information comprises information indicating that the mobile device has been determined, based at least on the information on the at least one property of the device comprised in the query information, to be one of suited to provide fingerprint information or unsuited to provide fingerprint information.

16. The apparatus according to claim 2, wherein the at least one memory and the computer program code are configured to, with the at least one processor, cause the apparatus to perform one of providing and causing to be provided fingerprint information of the one or more types, if the information comprised in the response information indicates that the device has been determined to be suited to provide fingerprint information of these one or more types.

17. The apparatus according to claim 1, wherein the quality of the fingerprint information is based on a deviation of the fingerprint information from reference fingerprint information.

18. The apparatus according to claim 1, wherein the quality of the fingerprint information is based on a relationship of an identifier of the at least one radio node and/or the at least one cell that is included in the fingerprint information relative to the identifiers of at least one radio node and/or at least one cell that are included in a plurality of other sets of fingerprint information.

19. The apparatus according to claim 1, wherein the quality of the fingerprint information is based on a determination as to whether an identifier of the at least one radio node and/or the at least one cell that is included in the fingerprint information and identifiers of at least one radio node and/or at least one cell that are included in a plurality of other sets of fingerprint information remain the same even though information regarding a position indicates that a coverage area of the at least one radio node and/or the at least one cell is likely to have been left.

20. The apparatus according to claim 1, wherein the map comprises an existing radio map.

\* \* \* \* \*